(12) United States Patent
Kamada et al.

(10) Patent No.: US 8,607,917 B2
(45) Date of Patent: Dec. 17, 2013

(54) ELECTRICALLY-OPERATED HYDRAULIC ACTUATOR UNIT AND HYDRAULIC FOUR-WHEEL-DRIVE WORK VEHICLE

(75) Inventors: Minoru Kamada, Amagasaki (JP); Nobuhiko Ichinose, Osaka (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 0 days.

(21) Appl. No.: 13/814,108

(22) PCT Filed: Jul. 21, 2011

(86) PCT No.: PCT/JP2011/066568
§ 371 (c)(1),
(2), (4) Date: Feb. 4, 2013

(87) PCT Pub. No.: WO2012/017831
PCT Pub. Date: Feb. 9, 2012

(65) Prior Publication Data
US 2013/0133970 A1  May 30, 2013

(30) Foreign Application Priority Data
Aug. 4, 2010 (JP) ................................. 2010-175749

(51) Int. Cl.
*B60K 17/356* (2006.01)
*F15B 13/16* (2006.01)

(52) U.S. Cl.
USPC ............ 180/242; 180/6.28; 180/6.3; 180/6.5; 180/420; 74/473.11; 91/361; 91/364; 91/459; 91/433; 60/718

(58) Field of Classification Search
USPC ............ 180/242, 6.28, 6.3, 6.5, 420; 91/361, 91/363, 459, 433; 74/473.11; 60/718
See application file for complete search history.

(56) References Cited

U.S. PATENT DOCUMENTS 7,617,919 B2 * 11/2009 Nett et al. .................... 192/52.4
8,191,456 B2 * 6/2012 Fusari et al. ................ 91/363 R

FOREIGN PATENT DOCUMENTS

JP 62-237165 10/1987
JP 2730722 3/1998
(Continued)

OTHER PUBLICATIONS

International Search Report of International Application No. PCT/JP2011/066568, Japanese Patent Office, mailed Oct. 25, 2011, 2 pages.

(Continued)

*Primary Examiner* — Tashiana Adams
*Assistant Examiner* — Marlon Arce
(74) *Attorney, Agent, or Firm* — Sterne, Kessler, Goldstein & Fox P.L.L.C.

(57) ABSTRACT

Provided an electrically-operated hydraulic actuator unit that includes an electrically-operated motor controlled by a control apparatus and actuating a volume adjusting mechanism through driving-side and driven-side arms, and a clutch mechanism in which the driven-side arm presses a contact member against a clutch case so that the driven-side arm is locked when a force from the volume adjusting mechanism is applied to the driven-side arm. The control apparatus can set duties of first to fourth drive signals to be output to the electrically-operated motor in a neutral-side start period, a neutral-side ordinary actuation period, a higher-volume-side start period and a higher-volume-side ordinary actuation period. The duties of the first and fourth drive signals are larger than that of the second drive signal, the duty of the third drive signal is larger than that of the fourth drive signal, and an integrated ON-time of the third drive signal is larger than that of the first drive signal.

12 Claims, 19 Drawing Sheets

(56) References Cited

FOREIGN PATENT DOCUMENTS

| | | |
|---|---|---|
| JP | 2001-59573 | 3/2001 |
| JP | 2006-70932 | 3/2006 |
| JP | 2006-322360 | 11/2006 |

OTHER PUBLICATIONS

English translation of International Preliminary Report on Patentability for International Application No. PCT/JP2011/066568, issued Mar. 12, 2013, 5 pages.

* cited by examiner

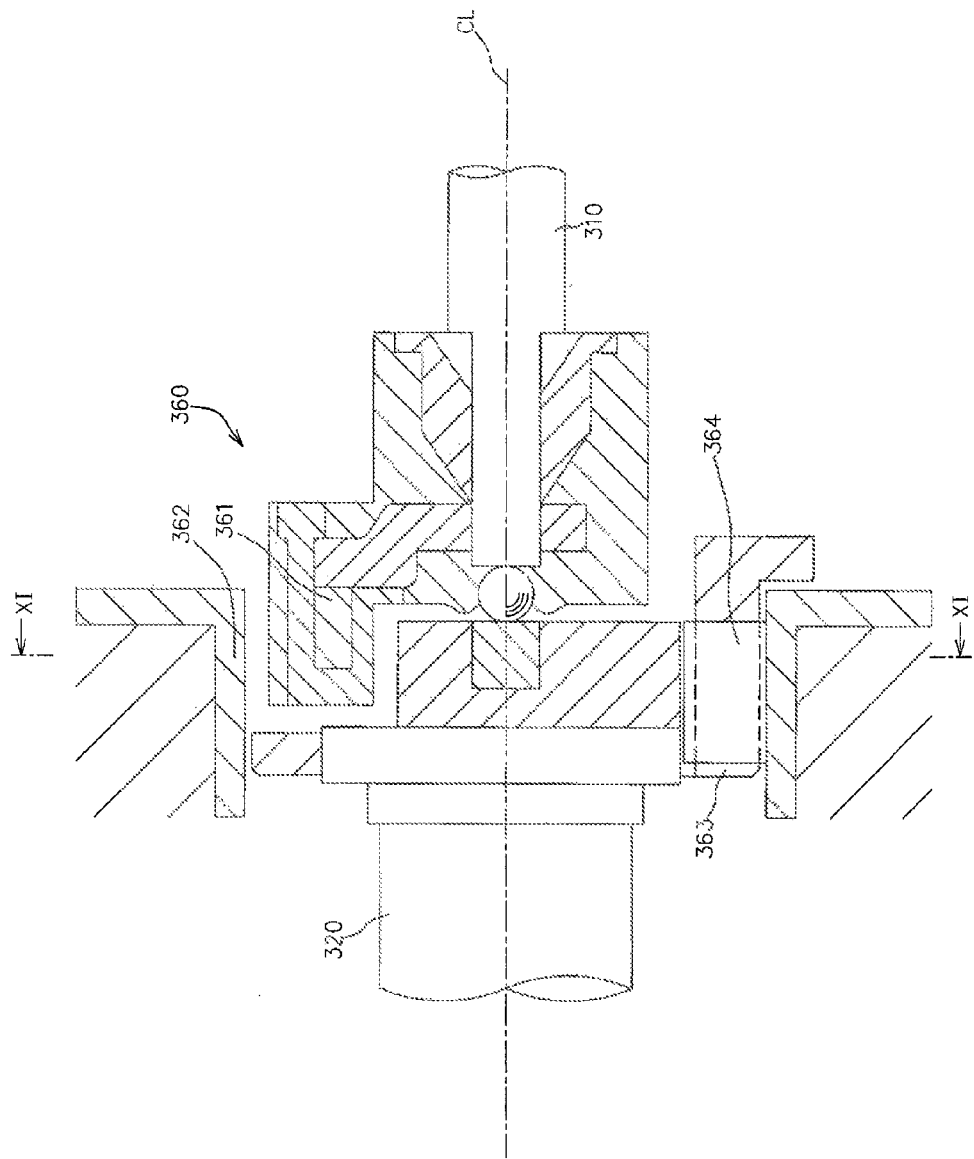

FIG.14

| Period P | Reference duty Dtb |
|---|---|
| P1 | Dtb1 |
| P2 | Dtb2 |
| P3 | Dtb3 |
| P4 | Dtb4 |

FIG.15

| Difference D | Correction value α |
|---|---|
| $D_0 \sim D_1$ | $\alpha_1$ |
| $D_1 \sim D_2$ | $\alpha_2$ |
| $D_2 \sim D_3$ | $\alpha_3$ |
| ⋮ | ⋮ |
| $D_{N-1} \sim D_N$ | $\alpha_N$ |

ELECTRICALLY-OPERATED HYDRAULIC ACTUATOR UNIT AND HYDRAULIC FOUR-WHEEL-DRIVE WORK VEHICLE

FIELD OF THE INVENTION

The present invention relates to an electrically-operated hydraulic actuator unit including a variable displacement hydraulic actuator, an electric motor that generates an operating force for actuating a volume adjusting mechanism of the variable displacement hydraulic actuator and a control device that controls an actuation of the electric motor, and also relates to a hydraulic four-wheel-drive work vehicle equipped with the motor-operated hydraulic actuator unit.

BACKGROUND ART

There is a conventional variable displacement hydraulic actuator unit, including a hydraulic actuator such as a hydraulic motor or a hydraulic pump, and a volume adjusting mechanism that changes a volume of the hydraulic actuator, wherein an operating force that actuates the volume adjusting mechanism is generated by an electrically-operated motor.

This sort of variable displacement hydraulic actuator unit is configured such that the electrically-operated motor is actuated based on a difference between a current volume of the hydraulic actuator (hereinafter, referred to as a "current volume") and a target volume thereof (hereinafter, referred to as a "target volume"), thereby matching the current volume to the target volume and maintaining the matched state.

Incidentally, the volume adjusting mechanism is always biased by a hydraulic pressure of an operating fluid toward a neutral side. Furthermore, the variable displacement hydraulic actuator unit may include a neutral biasing mechanism that biases the volume adjusting mechanism to the neutral side. In this manner, the biasing force to the neutral side is applied as an external force to the volume adjusting mechanism. Furthermore, in addition to the biasing force, an external force to the neutral side may be applied by some sort of factor to the volume adjusting mechanism or the hydraulic actuator.

When such an external force is applied to the volume adjusting mechanism, a problem occurs in which the volume of the hydraulic actuator becomes unintentionally offset from the target volume. Accordingly, in order to prevent this problem from occurring and to maintain a state in which the volume of the hydraulic actuator matches the target volume, a force that can counteract the external force (hereinafter, referred to as a "counteracting force") is necessary.

Examples of conceivable means for obtaining the counteracting force include means for continuously supplying a required electrical power to the electrically-operated motor even after the volume of the hydraulic actuator has matched the target volume, and means for stopping the electrical power supply to the electrically-operated motor and obtaining a force of inertia (internal resistance) of the electrically-operated motor as the counteracting force.

However, if the former means is used, a large amount of electrical power is consumed, and, moreover, heat generated by the electrically-operated motor may cause operational errors, malfunctions, and the like.

On the other hand, if the latter means is used, the above-described problem still occurs when an external force exceeding the force of inertia is applied to the volume adjusting mechanism.

The present invention has been made in view of these conventional techniques, and it is an object thereof to provide an electrically-operated hydraulic actuator unit and a hydraulic four-wheel drive work vehicle in which, while allowing a volume adjusting mechanism to be actuated by an electrically-operated motor, it is possible to prevent a volume of a hydraulic actuator from being unintentionally changed by an external force applied to the volume adjusting mechanism or the hydraulic actuator.

PRIOR ART DOCUMENT

Patent Document

Patent document 1: Japanese unexamined patent publication No. 2006-322360
Patent document 2: Japanese unexamined patent publication No. S62-237165

DISCLOSURE OF THE INVENTION

The present invention has been achieved in view of the conventional art described above, and an object thereof is to provide an electrically-operated hydraulic actuator unit and a hydraulic four-wheel-drive work vehicle, both which are capable of preventing a volume of a hydraulic actuator from being unintentionally changed by an external force applied to a volume adjusting mechanism or the hydraulic actuator while allowing the volume adjusting mechanism to be actuated by an electrically-operated motor.

In order to achieve the object, the present invention provides an electrically-operated hydraulic actuator unit including a variable displacement hydraulic actuator, an electrically-operated motor that generates an operating force for actuating a volume adjusting mechanism included in the variable displacement hydraulic actuator, and a control apparatus that controls action of the electrically-operated motor, the electrically-operated hydraulic actuator unit further including a clutch mechanism interposed between the volume adjusting mechanism and the electrically-operated motor, wherein the clutch mechanism includes a driving-side member that is rotated around a clutch reference axis by a rotational power from the electrically-operated motor, a driven-side member that is rotated around the clutch reference axis by the driving-side member and that is operatively linked to the volume adjusting mechanism, a clutch case that surrounds the driving-side member and the driven-side member, and a contact member accommodated in the clutch case so as to be rotated around the clutch reference axis along with the driven-side member by the driving-side member, the clutch mechanism being configured such that, when the driven-side member is pressed around the clutch reference axis by a force from the volume adjusting mechanism in a case where the electrically-operated motor is in a non-actuated state, the driven-side member presses the contact member against the clutch case to cause the driven-side member to be in a non-rotational locked state, whereby a power transmission from the driven-side member to the driving-side member is prevented, wherein the control apparatus includes a drive signal output portion that outputs a drive signal having a predetermined cycle to the electrically-operated motor, and a duty setting portion that sets a duty of the drive signal to be output by the drive signal output portion, wherein the duty setting portion sets a duty of a first drive signal that is to be output to the electrically-operated motor within a neutral-side start period having a predetermined time duration from a starting point in time at which an actuation of the motor toward the neutral side is started and a duty of a second drive signal that is to be output to the electrically-operated motor within a neutral-side ordinary period after the neutral-side start period when the volume adjusting mechanism has to be activated to the neutral side, while setting a duty of a third drive signal that is to be output to the electrically-operated motor within a higher-volume-side start period having a predetermined time duration from a starting point in time at which an actuation of the motor toward the higher-volume side is started and a duty of a fourth drive signal that is to be output to the electrically-operated motor within a higher-volume-side ordinary period after the higher-volume-side start period when the volume adjusting mechanism has to be activated to the higher-volume side, and wherein the duties of the first to fourth drive signal are set so that the duties of the first and fourth drive signals are larger than the duty of the second drive signal, and the duty of the third drive signal is larger than the duty of the fourth drive signal, while an integrated value of the time during which the third drive signal that is to be output within the higher-volume-side start period is on-state is larger than an integrated value of the time during which the first drive signal that is to be output within the neutral-side start period is on-state.

In the present invention, when the driven-side member is pressed around the clutch reference axis by a force from the volume adjusting mechanism in a state where the electrically-operated motor is in a non-actuated state, the driven-side member presses the contact member against the clutch case to cause the driven-side member to be in a non-rotational locked state, whereby a power transmission from the driven-side member to the driving-side member is prevented. Accordingly, the present invention can prevent the volume of the hydraulic actuator to be unintentionally changed by an external force that is applied to the volume adjusting mechanism in a direction toward the neutral side or an external force that may be applied to the variable displacement hydraulic actuator while allowing the electrically-operated motor to actuate the volume adjusting mechanism through the driving-side member and the driven-side member.

Furthermore, in the present invention, at the time when the electrically-operated motor is actuated so that the variable displacement hydraulic actuator has the target volume, actuation periods of the electrically-operated motor in the case of actuation of the volume adjusting mechanism to the neutral side and the higher volume side are each divided into a start period in which the actuation is started from the non-actuated state and an ordinary actuation period after the start period, and the actuation of the electrically-operated motor is controlled in an appropriate manner for each period. Accordingly, the present invention can properly actuate the volume adjusting mechanism.

That is to say, in consideration of the fact that the volume adjusting mechanism is biased toward the neutral side, the present invention sets the duty of the fourth drive signal that is to be output within the higher volume side ordinary actuation period larger than the duty of the second drive signal that is to be output within the neutral side ordinary actuation period, thereby preventing lack of the operating force at the time when actuating the volume adjusting mechanism to the higher volume side.

Furthermore, the driven-side member is locked if a force from the volume adjusting mechanism is applied in a case where the electrically-operated motor is in a non-actuated state, and therefore it is needed to cancel the locked state when the actuation of the volume adjusting mechanism is started, as described above.

In consideration of this point, the present invention sets the duty of the drive signal that is to be output within the start period larger than the duty of the drive signal that is to be output within the ordinary actuation period.

More specifically, in a case where the volume adjusting mechanism is needed to be actuated to the neutral side, the duty of the first drive signal that is to be output within the neutral-side start period is set larger than the duty of the second drive signal that is to be output within the neutral-side ordinary period, and, in a case where the volume adjusting mechanism is needed to be actuated to the higher volume side, the duty of the third drive signal that is to be output within the higher-volume-side start period is set larger than the duty of the fourth drive signal that is to be output within the higher-volume-side ordinary period.

Furthermore, the operating torque necessary for actuating the volume adjusting mechanism to the higher volume side is larger, by a biasing force acting on the volume adjusting mechanism to the neutral side, than the operating torque necessary for actuating the volume adjusting mechanism to the neutral side. The same is applied to the case of cancellation of the locked state.

In consideration of this aspect, in the present invention, an integrated value of the time during which the third drive signal that is to be output within the higher-volume-side start period is on-state is larger than an integrated value of the time during which the first drive signal that is to be output within the neutral-side start period is on-state. The configuration makes it possible to secure the operating torque necessary for canceling the locked state both in a case of actuation of the volume adjusting mechanism to the neutral side and the higher volume side, thereby reliably canceling the locked state.

The configuration in which the integrated value of the time during which the third drive signal that is to be output within the higher-volume-side start period is on-state is larger than an integrated value of the time during which the first drive signal that is to be output within the neutral-side start period is on-state is exemplified by, for example, an embodiment in which a length of the higher-volume-side start period is longer than a length of the neutral-side start period, and the duty of the third drive signal is set to be larger than or equal to the duty of the first drive signal.

Alternatively, the configuration can be also realized by an embodiment in which a length of the higher-volume-side start period is same as a length of the neutral-side start period, and the duty of the third drive signal is set to be larger than the duty of the first drive signal.

In any one of the above-mentioned various configurations, the electrically-operated hydraulic actuator unit according to the present invention may preferably include a current volume detecting portion that detects a current volume of the variable displacement hydraulic actuator, a target volume detecting portion that detects a target volume of the variable displacement hydraulic actuator, and a difference calculating portion that calculates a difference between the current volume detected by the current volume detecting portion and the target volume detected by the target volume detecting portion.

The duty setting portion determines whether the direction in which the volume adjusting mechanism is to be actuated is the higher volume side or the neutral side, based on the difference calculated by the difference calculating portion, and then sets either a set of the duties of the first and the second drive signals or a set of the duties of the third and the fourth drive signals according to the determination result.

The configuration makes it possible to properly determine the direction in which the volume adjusting mechanism should be actuated, and also the duties of either the set of the first and second drive signals or the set of the third and fourth drive signals.

In any one of the above-mentioned various configurations of the electrically-operated hydraulic actuator unit according to the present invention, the duty setting portion may preferably include a reference duty storage portion that stores, as respective reference duties, initial values of duties that have been preset for the first to the fourth drive signals, a correction value storage portion that stores in advance correction values for correcting the reference duty according to the difference calculated by the difference calculating portion, and a first duty correcting portion that reads the correction value associated with the difference from the correction value storage portion upon the calculation of the difference by the difference calculating portion and then corrects the reference duty associated with the current period among the periods with using the read correction value.

In the preferable configuration, since the first duty correcting portion corrects the reference duty associated with the current period among the periods with using the correction value associated with the difference that is calculated by the difference calculating portion, the operating torque of the electrically-operated motor can be set in accordance with the difference. Accordingly, the preferable configuration makes it possible to suitably change a time length required to match the volume of the variable displacement hydraulic actuator to the target volume.

The correction value is preferably set to become larger as the difference calculated by the difference calculating portion becomes larger.

The configuration makes it possible to increase the operating torque of the electrically-operated motor as the difference is larger. Accordingly, the time until the current volume of the variable displacement hydraulic actuator is matched to the target volume can be shortened compared with the case in which the reference duty is not corrected in accordance with the difference.

Preferably, the duty setting portion may further include a second duty correcting portion for correcting the duty, which has been corrected by the first duty correcting portion, according to a voltage of a battery that is an electrical power source of the electrically-operated motor.

The preferable configuration can exert a following effect.

More specifically, if the voltage of the battery changes, the voltage values of the first to the fourth drive signals that are to be output to the electrically-operated motor change. As a result, the electrical power that is to be supplied to the electrically-operated motor also changes.

When the electrical power that is to be output to the electrically-operated motor changes as described above, the operating torque of the electrically-operated motor changes even if the respective duties of the first to fourth drive signals are suitably set. As a result, the operating torque becomes excessively large or small, which makes it impossible to match the volume of the variable displacement hydraulic actuator to the target volume.

On the other hand, the provision of the second duty correcting portion for correcting the duty, which has been corrected by the first duty correcting portion, according to the voltage of the battery can effectively prevent such a problem.

For example, the second duty correcting portion corrects the duty that has been corrected by the first duty correcting portion so that the duty becomes smaller in proportion to increase of the voltage of the battery.

Preferably, the duty setting portion may further include a reference duty storage portion that stores, as respective reference duties, initial values of duties that have been preset for the first to the fourth drive signals, and a reference duty correcting portion that corrects the reference duty of one of the first to fourth drive signals that is to be output associated with the current period in accordance with a voltage of a battery functioning as an electrical power source of the electrically-operated motor.

The configuration makes it possible to effectively prevent fluctuation of the operating torque of the electrically-operated motor due to change of the battery voltage.

For example, the reference duty correcting portion corrects the reference duty so that the duty becomes smaller in proportion to increase of the battery voltage.

In any one of the various configurations, the driving-side member may be configured such that side faces oriented in the circumferential direction with respect to the clutch reference axis can press, in the circumferential direction, respective side faces oriented in the circumferential direction of the driven-side member and the contact member, and, when viewed along the clutch reference axis, an outer end face of the driven-side member oriented outward in the radial direction may have a circumferential center portion in which a distance to the axis is smaller than a distance (L) from the contact member to the axis and a circumferential outer portion in which the distance to the axis is larger than the distance (L).

According to the configuration, since the outer end face of the driven-side member has the circumferential center portion in which a distance to the axis is smaller than the distance (L) from the contact member to the axis and the circumferential outer portion in which the distance to the axis is larger than the distance (L), when the driven-side member is arranged at a position around a reference (rotation center) that causing the circumferential center portion of the driven-side member to confront the contact member, the driven-side member is rotatable around the clutch reference axis so that the driven-side member and the contact member are rotated around the clutch reference axis by the driving-side member. On the other hand, when the driven-side member is pressed around the clutch reference axis by a force from the volume adjusting mechanism in a case where the electrically-operated motor is in a non-actuated state, the driven-side member presses the contact member against the clutch case so that the driven-side is in a non-rotatable locked state.

Furthermore, the present invention provides a hydraulic four-wheel-drive work vehicle including a vehicle frame, a driving power source supported by the vehicle frame, first and second wheels supported by one and the other sides in a front-and-rear direction of the vehicle frame, a hydraulic pump unit operatively driven by the driving power source, and first and second hydraulic motor units that are fluid-connected to the hydraulic pump unit and that operatively drives the first and second wheels (10, 20), respectively, wherein the first hydraulic motor that operatively drives the first wheel is embodied by the electrically-operated hydraulic actuator unit according to any one of the above-mentioned various configurations.

BRIEF DESCRIPTION OF THE DRAWINGS

FIG. 10 is a cross sectional view taken along line X-X in FIG. 6.

FIG. 14 is a figure showing a table related to a relationship between the respective periods P1-P4 and reference duties Dtb1-Dtb4 that is stored in a reference duty storage portion in advance.

FIG. 15 is a figure showing a table related to a relationship between a difference D and a correction value a that is stored in a correction value storage portion.

EMBODIMENT FOR CARRYING OUT THE INVENTION

Hereinafter, an electrically-operated hydraulic actuator unit according to an embodiment of the present invention will be described with reference to the appended drawings.

FIGS. 1A to 1C show plan views of a hydraulic four-wheel drive work vehicle (hereinafter, referred to as a "work vehicle") 1 to which the electrically-operated hydraulic actuator unit according to the present embodiment has been applied. FIG. 1A shows a state in which the work vehicle 1 is traveling straight ahead, and FIG. 1B shows a state in which the work vehicle 1 is turning. FIG. 2 shows a diagram of a hydraulic circuit of the work vehicle 1.

Figure 1:
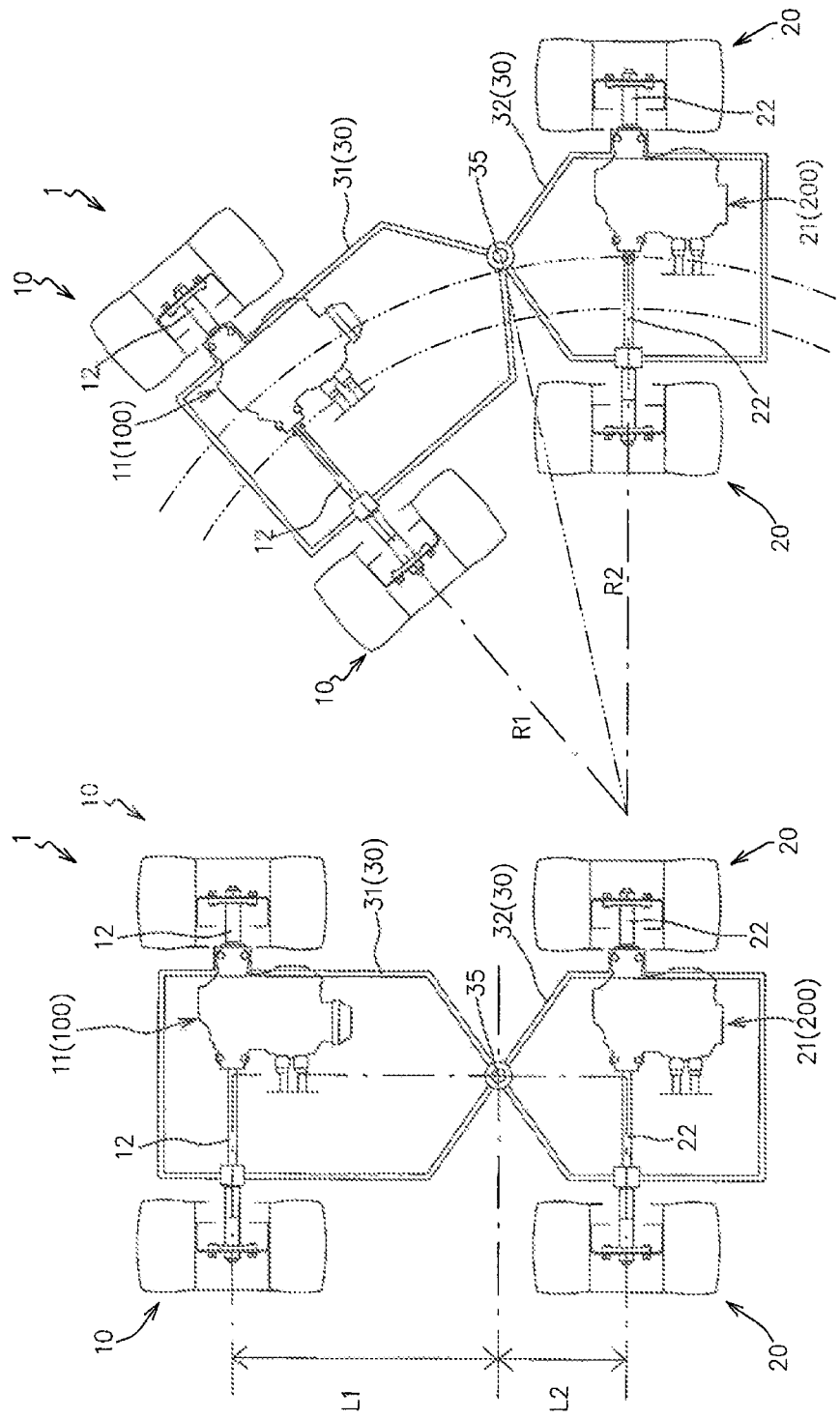
FIG. 1A is a plan view of a hydraulic four-wheel-drive work vehicle according to one embodiment of the present invention, and shows a straight-traveling state.
FIG. 1B is a plan view of the hydraulic four-wheel-drive work vehicle according to one embodiment of the present invention, and shows a turning state.
Figure 2:
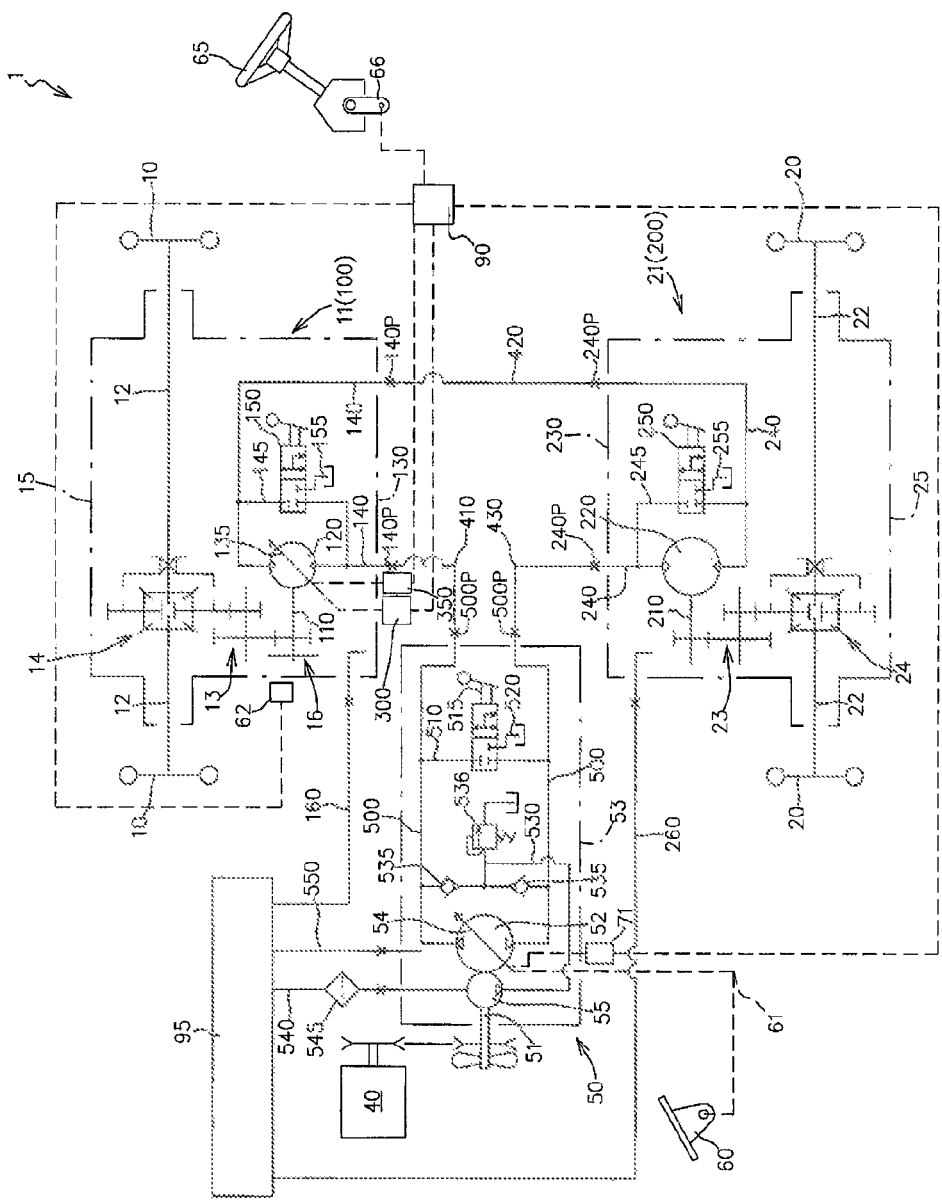
FIG. 2 is a hydraulic circuit diagram of the work vehicle shown in FIGS. 1A and 1B.

As shown in FIGS. 1 and 2, the electrically-operated hydraulic actuator unit according to the present embodiment is used as a hydraulic motor unit. Specifically, the electrically-operated hydraulic actuator unit according to the present embodiment functions as a hydraulic motor unit that operatively drives one of first and second wheels 10 and 20 respectively arranged on one side and the other side in the vehicle front-and-rear direction of the work vehicle 1.

First, an outline of the work vehicle 1 will be described.

As shown in FIGS. 1 and 2, the work vehicle 1 includes a vehicle frame 30, a pair of the first wheels 10 arranged on right and left sides (front wheels in this example) and a pair of the second wheels 20 arranged on right and left sides (rear wheels in this example) that are respectively supported on one side and the other side in the front-and-rear direction of the vehicle frame 30, a driving source 40 that is supported on the vehicle frame 30, a variable displacement hydraulic pump unit 50 that is operatively driven by the driving source 40, an electrically-operated hydraulic actuator unit 100 according to the present embodiment functioning as a first hydraulic motor unit that is fluid-connected to the hydraulic pump unit 50 and that is for operatively driving the first wheels 10, and a second hydraulic motor unit 200 that is fluid-connected to the hydraulic pump unit 50 and that is for operatively driving the second wheels 20.

The electrically-operated hydraulic actuator unit 100 is of a variable displacement type in order to compensate for a difference between turning radiuses of the first and the second wheels 10 and 20, which occurs when the vehicle is turning.

Specifically, as shown in FIGS. 1A and 1B, the work vehicle 1 is configured such that a turning radius R1 of the first wheels 10 is smaller than a turning radius R2 of the second wheels 20 and the difference between the turning radiuses of the first and the second wheels 10 and 20 increases as a turning angle of the vehicle increases.

In the present embodiment, as shown in FIGS. 1A and 1B, the work vehicle 1 is of an articulated type having, as the vehicle frame 30, first and second frames 31 and 32 that are linked in a swingable manner about a substantially vertical pivotal support shaft 35.

The second wheels 20 are supported on the second frame 32, and the first wheels 10 are supported on the first frame 31 such that a length L1 in the vehicle front-and-rear direction between the first wheels 10 and the pivotal support shaft 35 is longer than a length L2 in the vehicle front-and-rear direction between the second wheels 20 and the pivotal support shaft 35.

In this configuration, the turning radius R1 of the first wheels 10 is smaller than the turning radius R2 of the second wheels 20, and the difference between the turning radiuses of the first and the second wheels 10 and 20 increases as the turning angle of the vehicle increases.

Note that examples of a work vehicle in which a difference occurs between the turning radiuses of a wheel on one side in the vehicle front-and-rear direction and a wheel on the other side include, in addition to the work vehicle 1 of an articulated type, a work vehicle in which a front wheel and a rear wheel are respectively supported on a front portion and a rear portion of a rigid vehicle frame and one of the front and rear wheels is used as a steering wheel.

The hydraulic pump unit 50 forms an HST in cooperation with the electrically-operated hydraulic actuator unit 100 and the second hydraulic motor unit 200.

Specifically, as shown in FIG. 2, the hydraulic pump unit 50, the electrically-operated hydraulic actuator unit 100, and the second hydraulic motor unit 200 are fluid-connected to each other in series.

That is to say, the hydraulic pump unit 50, the electrically-operated hydraulic actuator unit 100, and the second hydraulic motor unit 200 are fluid-connected to each other such that, when the vehicle is traveling forward (i.e., when the hydraulic pump unit 50 is driven forward), pressurized fluid discharged from the hydraulic pump unit 50 is supplied to one of the electrically-operated hydraulic actuator unit 100 and the second hydraulic motor unit 200 (the electrically-operated hydraulic actuator unit 100 in this example), operating fluid returned from the one hydraulic motor unit is supplied to the other of the electrically-operated hydraulic actuator unit 100 and the second hydraulic motor unit 200 (the second hydraulic motor unit 200 in this example), and operating fluid returned from the other hydraulic motor unit is returned to the hydraulic pump unit 50.

In this case, when the vehicle is traveling in reverse (i.e., when the hydraulic pump unit 50 is driven in reverse), pressurized fluid discharged from the hydraulic pump unit 50 is supplied to the other hydraulic motor unit (the second hydraulic motor unit 200 in this example), operating fluid returned from the other hydraulic motor unit is supplied to the one hydraulic motor unit (the electrically-operated hydraulic actuator unit 100 in this example), and operating fluid returned from the one hydraulic motor unit is returned to the hydraulic pump unit 50.

As described above, the hydraulic pump unit 50 is of a variable displacement type, and functions as a main speed-change device of the work vehicle 1.

Specifically, as shown in FIG. 2, the hydraulic pump unit 50 includes a pump shaft 51 that is operatively linked to the driving source 40, a hydraulic pump 52 that is supported on the pump shaft 51 in a relatively non-rotatable manner about this shaft, a pump housing 53 that accommodates the hydraulic pump 52 and supports the pump shaft 51 in a rotatable manner about its axis, and a pump-side volume adjusting mechanism 54 that changes the volume of the hydraulic pump 52 based on an operation from the outside.

As shown in FIG. 2, the pump housing 53 is provided with a pair of pump-side operating fluid lines 500 having first end portions fluid-connected to the hydraulic pump 52 and second end portions exposed on the outer surface to form a pair of pump-side connecting ports 500P.

As shown in FIG. 2, the pump housing 53 is further provided with a pump-side bypass line 510 that interconnects the pair of pump-side operating fluid lines 500, a pump-side drain line 520 having a first end portion fluid-connected to the pump-side bypass line 510 and a second end portion exposed to an internal space of the pump housing 53, and a pump-side bypass valve 515.

The pump-side bypass valve 515 can be selectively switched between a block position at which the pump-side bypass line 510 is blocked and the pump-side drain line 520 is blocked from the pump-side bypass line 510 and a bypass-drain position at which the pump-side bypass line 510 is interconnected and the pump-side drain line 520 is fluid-connected to the pump-side bypass line 510.

Furthermore, the pump housing 53 is provided with a charge line 530.

Specifically, as shown in FIG. 2, the hydraulic pump unit 50 has, in addition to the above-described constituent components, a charge pump 55 that is operatively driven by the pump shaft 51.

Furthermore, the charge line 530 has a first end portion fluid-connected to a discharge side of the charge pump 55 and a second end portion fluid-connected via a pair of check valves 535 respectively to the pair of pump-side operating fluid lines 500.

Note that, in FIG. 2, reference numeral 536 denotes a charge relief valve that sets the pressure of oil in the charge line 530, reference numeral 95 denotes an oil tank that functions as an oil source for the charge pump 55, and reference numeral 545 denotes a filter that is installed in a charge suction line 540 through which the oil tank 95 and a suction side of the charge pump 55 are fluid-connected to each other.

Furthermore, reference numeral 550 denotes a drain line through which the oil tank 95 and the internal space of the pump housing 53 are fluid-connected to each other.

The pump-side volume adjusting mechanism 54 is actuated according to a manual operation on a speed-change operating member 60 included in the work vehicle 1.

For example, the amount of manual operation on the speed-change operating member 60 can be relayed via a mechanical link mechanism 61 (see FIG. 2) to the pump-side volume adjusting mechanism 54.

Alternatively, a configuration is also possible in which the hydraulic pump unit 50 includes a pump-side actuator such as an electrically-operated motor that actuates the pump-side volume adjusting mechanism 54, and the work vehicle 1 includes a speed-change operation-side detecting portion that detects an amount of manual operation on the speed-change operating member, a speed-change actuation-side detecting portion that detects an actuation state of the pump-side actuator, and a control apparatus 90 (described later), wherein the control apparatus 90 controls actuation of the pump-side actuator based on signals from the speed-change operation-side detecting portion and the speed-change actuation-side detecting portion such that the pump-side volume adjusting mechanism 54 is actuated according to the amount of operation on the speed-change operating member 60.

The pump-side volume adjusting mechanism 54 may have, for example, a pump-side control shaft (not shown) that is rotatable about its axis, and a pump-side movable swash plate (not shown) that is operatively linked to the pump-side control shaft in a rotatable manner at an angle about its swing axis according to rotation of the pump-side control shaft about its axis.

Next, the second hydraulic motor unit 200 will be described.

Specifically, as shown in FIG. 2, the second hydraulic motor unit 200 includes a second hydraulic motor 220, a second motor shaft 210 that supports the second hydraulic motor 220 in a relatively non-rotatable manner about this shaft, and a second motor housing 230 that accommodates the second hydraulic motor 220 and supports the second motor shaft 210 in a rotatable manner about its axis. In this example, the second hydraulic motor unit 200 is of a fixed displacement type in which the second hydraulic motor 220 has a fixed volume.

The second motor housing 230 is provided with a pair of second motor-side operating fluid lines 240 having first end portions fluid-connected to the second hydraulic motor 220 and second end portions exposed on the outer surface to form a pair of second motor-side connecting ports 240P.

As shown in FIG. 2, the second motor housing 230 is further provided with a second motor-side bypass line 245 that interconnects the pair of second motor-side operating fluid lines 240, a second motor-side drain line 255 having a first end portion fluid-connected to the second motor-side bypass line 245 and a second end portion exposed to an internal space of the second motor housing 230, and a second motor-side bypass valve 250.

The second motor-side bypass valve 250 can be selectively switched between a block position at which the second motor-side bypass line 245 is blocked and the second motor-side drain line 255 is blocked from the second motor-side bypass line 245 and a bypass-drain position at which the second motor-side bypass line 245 is interconnected and the second motor-side drain line 255 is fluid-connected to the second motor-side bypass line 245.

Furthermore, reference numeral 260 denotes a drain line through which the oil tank and the internal space of the second motor housing 230 are fluid-connected to each other.

As shown in FIG. 2, in this example, the second hydraulic motor unit 200 forms a second axle driving apparatus 21 that drives the second wheels 20.

Specifically, the second axle driving apparatus 21 has, in addition to the second hydraulic motor unit 200, a pair of left and right second axles 22 that are respectively linked to the second wheels 20, a second differential gear mechanism 24 that receives a rotational driving power input from the second motor shaft 210 via a second reduction gear train 23 and transmits the power to the pair of second axles 22 while allowing them to rotate at different speeds, and a second axle housing 25 that accommodates the second reduction gear train 23 and the second differential gear mechanism 24 and supports the pair of second axles 22 in a rotatable manner about their axis.

Note that the second axle housing 25 and the second motor housing 230 are formed in one piece.

Next, the electrically-operated hydraulic actuator unit 100 according to the present embodiment functioning as the first hydraulic motor unit will be described.

As described above, the electrically-operated hydraulic actuator unit 100 is of a variable displacement type, and can change the driving speed of the first wheels 10 according to the difference between the turning radiuses of the first and the second wheels 10 and 20 in the work vehicle 1.

Specifically, as shown in FIGS. 1A and 1B, in the work vehicle 1, the first and the second wheels 10 and 20 are arranged such that the turning radius of the first wheels 10 gradually decreases with respect to the turning radius of the second wheels 20 according to the turning angle of the vehicle.

Furthermore, the electrically-operated hydraulic actuator unit 100 that operatively drives the first wheels 10 is of a variable displacement type such that it can function as a speed-change device that changes the driving speed of the corresponding first wheels 10 according to the difference between the turning radiuses. The electrically-operated hydraulic actuator unit 100 according to the present embodiment is used as a first hydraulic motor unit that functions in this manner.

Figure 3A:
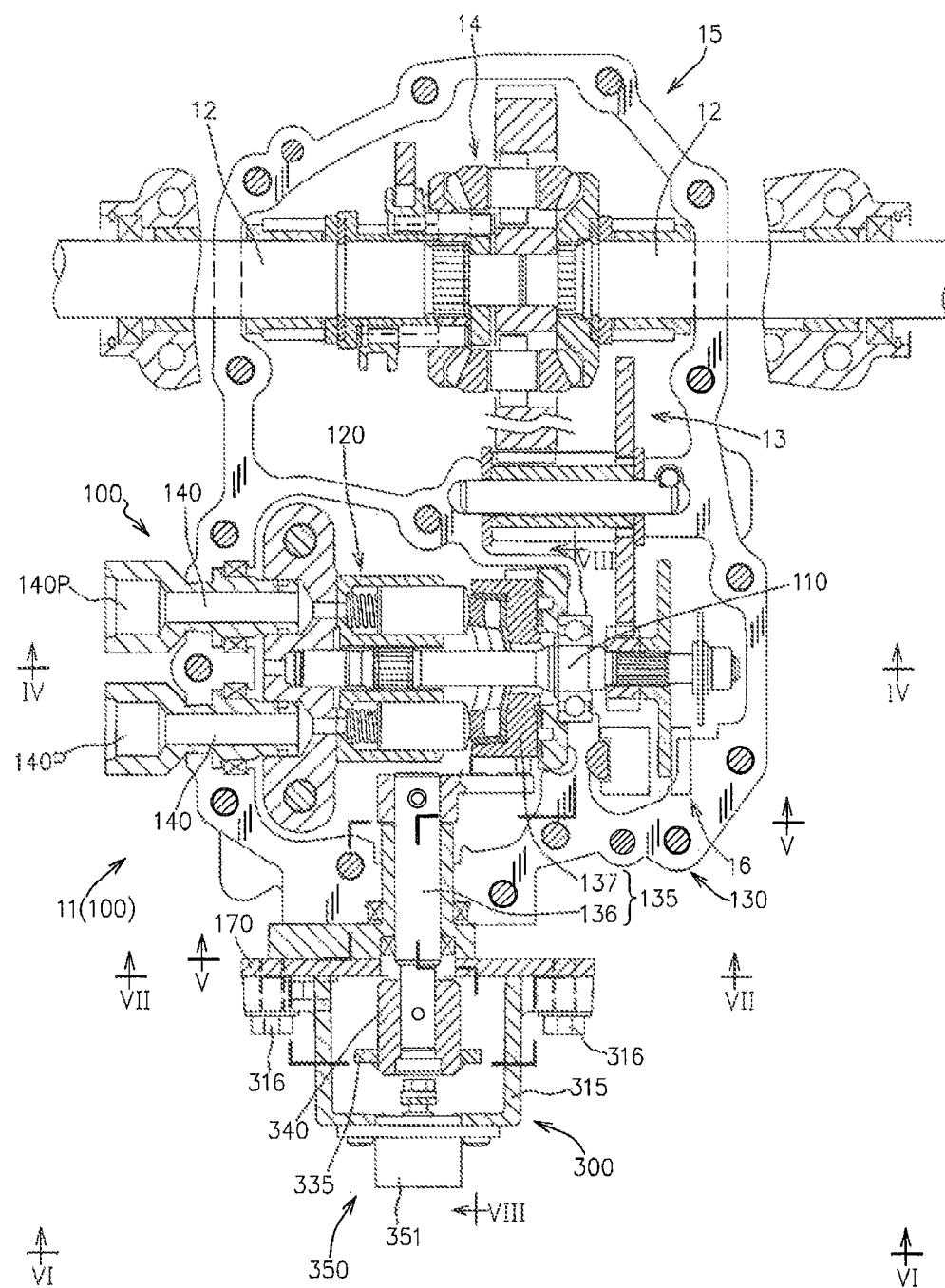
FIG. 3A is a horizontal cross sectional plan view of a variable displacement hydraulic motor unit provided in the work vehicle.
Figure 4:
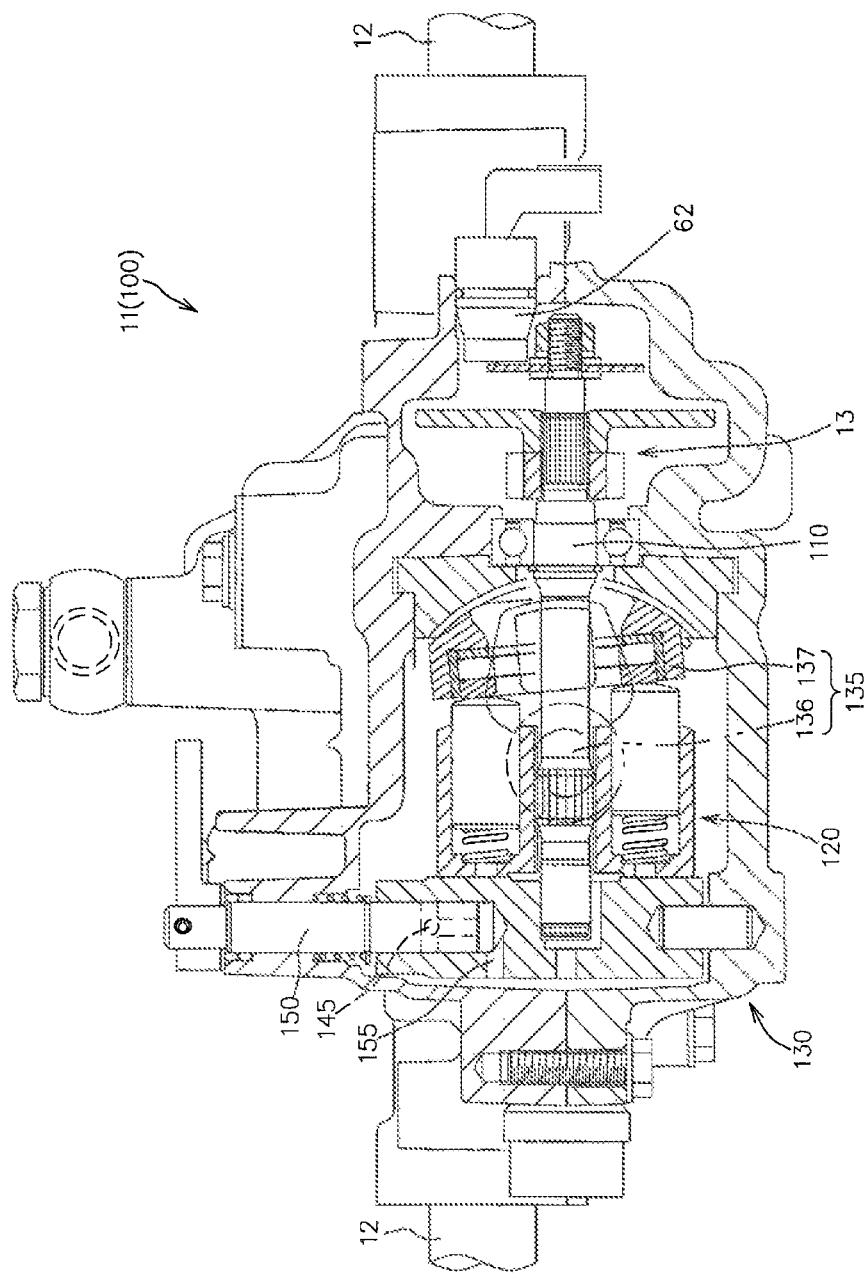
FIG. 4 is a cross sectional view taken along line IV-IV in FIG. 3A.

FIG. 3A shows a horizontal plan view of the electrically-operated hydraulic actuator unit 100. FIG. 4 shows a cross-sectional view taken along the line IV-IV in FIG. 3A.

As shown in FIGS. 2 to 4, the electrically-operated hydraulic actuator unit 100 is configured including a first hydraulic motor 120 (corresponding to a variable displacement hydraulic actuator) that includes a motor-side volume adjusting mechanism 135, an electrically-operated motor 300 such as a direct current motor that generates a; force for actuating the motor-side volume adjusting mechanism 135 of the first hydraulic motor 120, and the control apparatus 90 that is in charge of controlling actuation of the electrically-operated motor 300.

The electrically-operated hydraulic actuator unit 100 further includes a first motor shaft 110 that supports the first hydraulic motor 120 in a relatively non-rotatable manner about this shaft, and a first motor housing 130 that accommodates the first hydraulic motor 120 and supports the first motor shaft 110 in a rotatable manner about its axis.

The first motor housing 130 is provided with a pair of first motor-side operating fluid lines 140 having first end portions fluid-connected to the first hydraulic motor 120 and second end portions exposed on the outer surface to form a pair of first motor-side connecting ports 140P.

As shown in FIG. 2, one of the pair of first motor-side connecting ports 140P is fluid-connected via a pump/first motor line 410 to one of the pair of pump-side connecting ports 500P, the other first motor-side connecting port 140P is fluid-connected via a first motor/second motor line 420 to one of the pair of second motor-side connecting ports 240P, and the other second motor-side connecting port 240P is fluid-connected via a pump/second motor line 430 to the other pump-side connecting port 500P.

That is to say, in this example, the hydraulic pump 52, the first hydraulic motor 120, and the second hydraulic motor 220 are fluid-connected to each other in series, and, thus, the first hydraulic motor 120 that operatively drives the first wheels 10 and the second hydraulic motor 220 that operatively drives the second wheels 20 are fluid-driven by the hydraulic pump 52 in a synchronized manner with each other.

As shown in FIGS. 2 and 4, the first motor housing 130 is further provided with a first motor-side bypass line 145 that interconnects the pair of first motor-side operating fluid lines 140, a first motor-side drain line 155 having a first end portion fluid-connected to the first motor-side bypass line 145 and a second end portion exposed to an internal space of the first motor housing 130, and a first motor-side bypass valve 150.

The first motor-side bypass valve 150 can be selectively switched between a block position at which the first motor-side bypass line 145 is blocked and the first motor-side drain line 155 is blocked from the first motor-side bypass line 145 and a bypass-drain position at which the first motor-side bypass line 145 is interconnected and the first motor-side drain line 155 is fluid-connected to the first motor-side bypass line 145.

Furthermore, reference numeral 160 denotes a drain line through which the oil tank 95 and the internal space of the first motor housing 130 are fluid-connected to each other.

Figure 5:
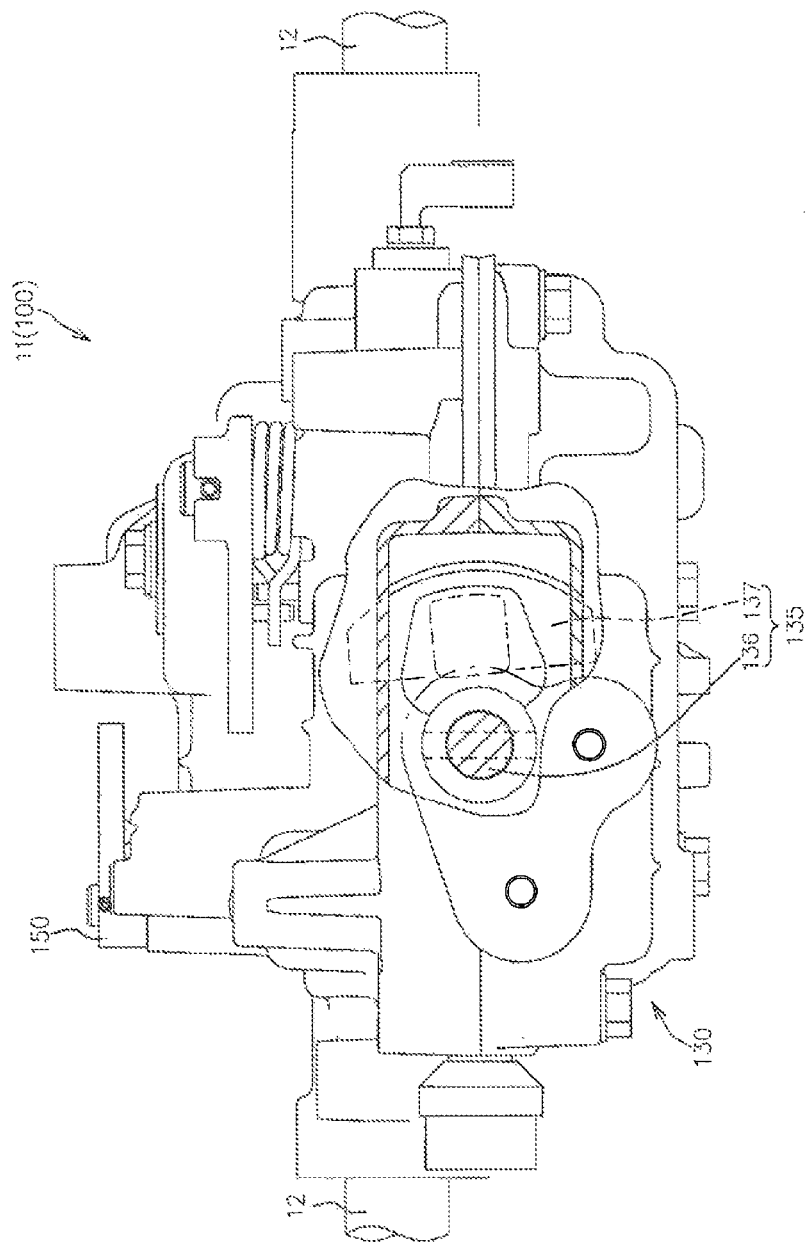
FIG. 5 is a cross sectional view taken along line V-V in FIG. 3A.

FIG. 5 shows a cross-sectional view taken along the line V-V in FIG. 3A.

As shown in FIGS. 3A and 5, the motor-side volume adjusting mechanism 135 has a motor-side control shaft 136 that is directly or indirectly supported on the first motor housing 130 in a rotatable manner about its axis in a state in which a first end portion of the motor-side control shaft 136 is projected outward from the first motor housing 130, and is configured so as to change the volume of the first hydraulic motor 120 as the motor-side control shaft 136 rotates about its axis.

As shown in FIGS. 3A and 4, in the present embodiment, the first hydraulic motor 120 is of an axial piston type.

Accordingly, as shown in FIG. 3A to FIG. 5, the motor-side volume adjusting mechanism 135 has, in addition to the motor-side control shaft 136, a motor-side movable swash plate 137 that can slant about its swing axis and increases or decreases the volume of the first hydraulic motor 120 according to the slanting position about the swing axis.

The motor-side movable swash plate 137 is linked to the motor-side control shaft 136 in a slanting manner about its swing axis according to rotation of the motor-side control shaft 136 about its axis.

As shown in FIGS. 2 and 3A, the electrically-operated hydraulic actuator unit 100 according to the present embodiment forms a first axle driving apparatus 11 that drives the first wheels 10.

Specifically, the first axle driving apparatus 11 has, in addition to the electrically-operated hydraulic actuator unit 100, a pair of left and right first axles 12 that are respectively linked to the first wheels 10, a first differential gear mechanism 14 that receives a rotational driving power input from the first motor shaft 110 via a first reduction gear train 13 and transmits the power to the pair of first axles 12 while allowing them to rotate at different speeds, and a first axle housing 15 that accommodates the first reduction gear train 13 and the first differential gear mechanism 14 and supports the pair of first axles 12 in a rotatable manner about their axis.

Note that the first axle housing 15 and the first motor housing 130 are formed in one piece as a single first housing.

Furthermore, in the present embodiment, as shown in FIGS. 2 and 3A, the first axle driving apparatus 11 includes a brake mechanism 16 that can selectively apply a braking force to a power transmission path in the traveling system from the first motor shaft 110 to the first axles 12.

Preferably, the brake mechanism 16 is configured so as to be capable of applying a braking force to a member positioned on the upstream side in the power transmission direction of the first reduction gear train 13.

With this preferable configuration, the size of the brake mechanism 16 can be reduced.

In the present embodiment, as shown in FIG. 3A, the brake mechanism 16 is configured so as to be capable of applying a braking force to the first motor shaft 110.

Figure 3B:
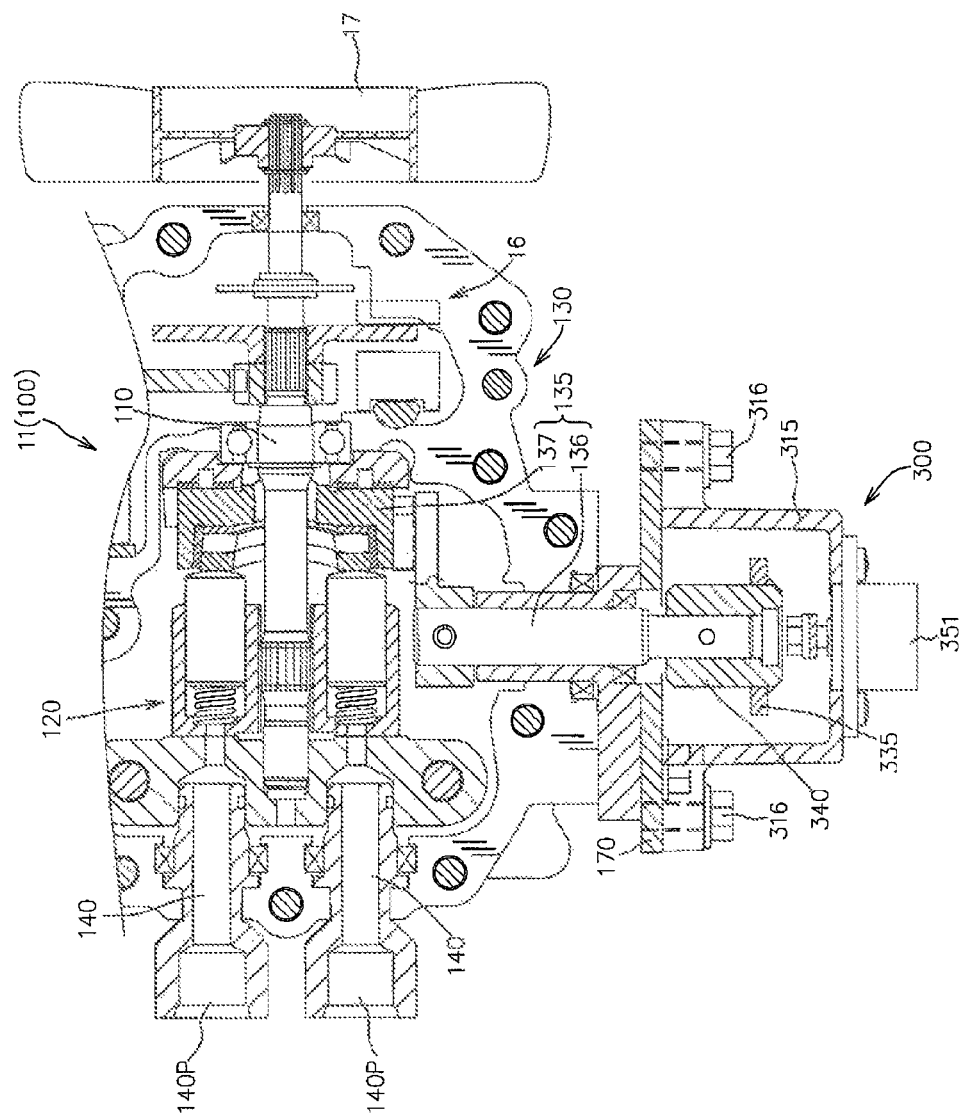
FIG. 3B is a horizontal cross sectional partial plan view of a modified example of the variable displacement hydraulic motor unit.

For example, as shown in FIG. 3B, one end portion of the first motor shaft 110 may be projected outward from the first housing 130, and the outward projected portion of the first motor shaft 110 may support a cooling fan 17.

With this configuration, the first axle driving apparatus 11 including the electrically-operated hydraulic actuator unit 100 can be efficiently cooled down.

Figure 6:
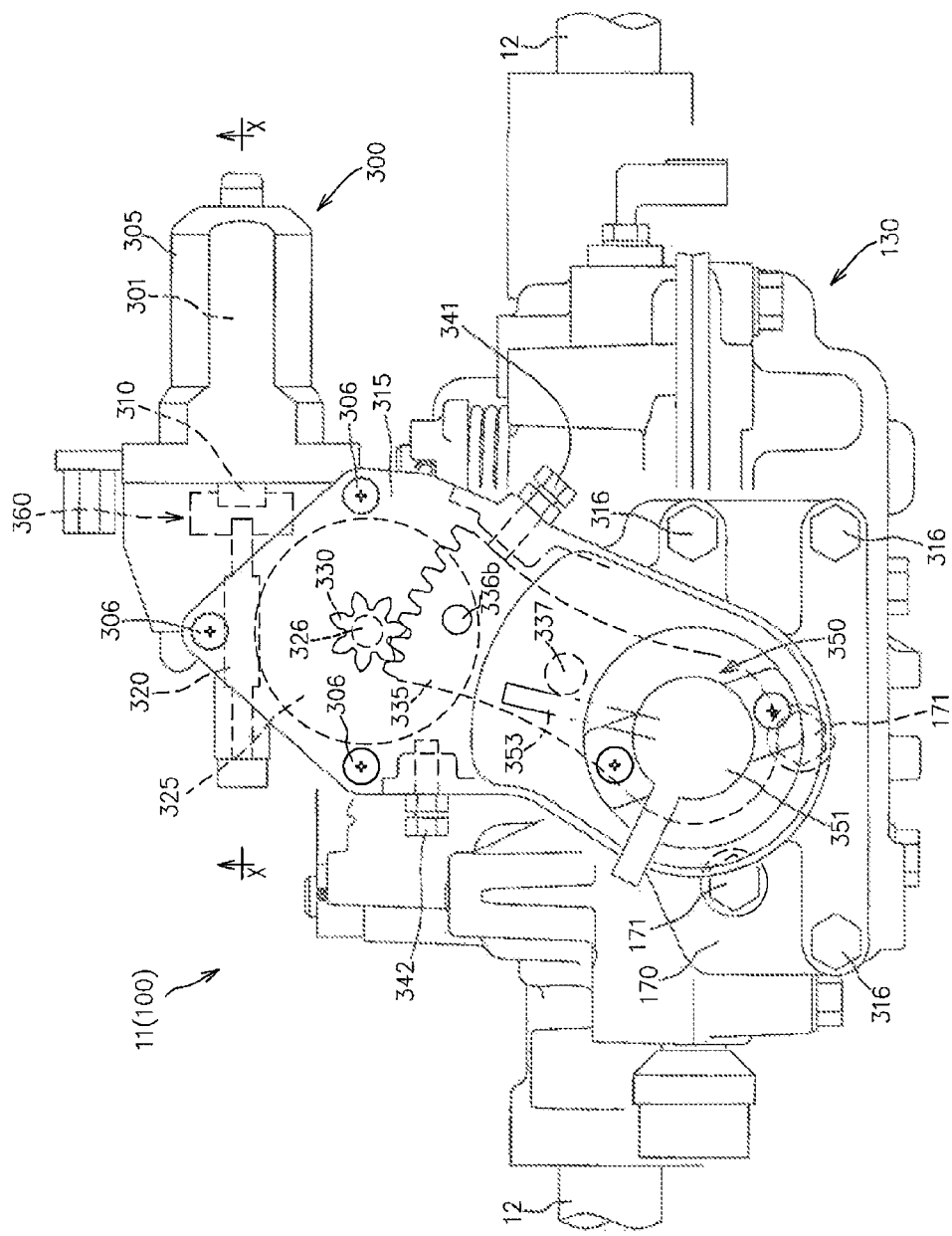
FIG. 6 is an end view taken along line VI-VI in FIG. 3A.

FIG. 6 shows an end face view taken along the line VI-VI in FIG. 3A.

Figure 7:
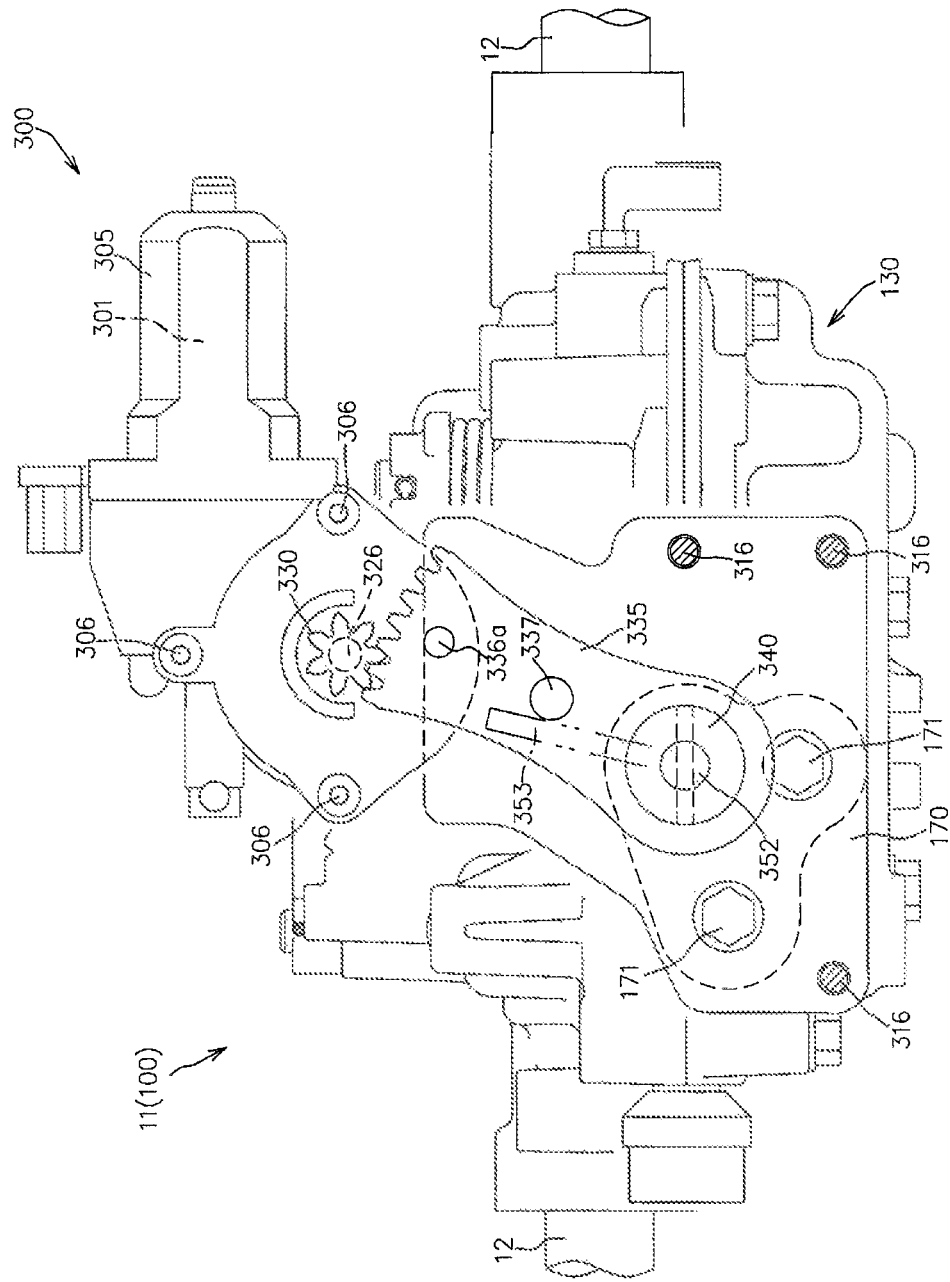
FIG. 7 is a cross sectional view taken along line VII-VI in FIG. 3A.
Figure 8:
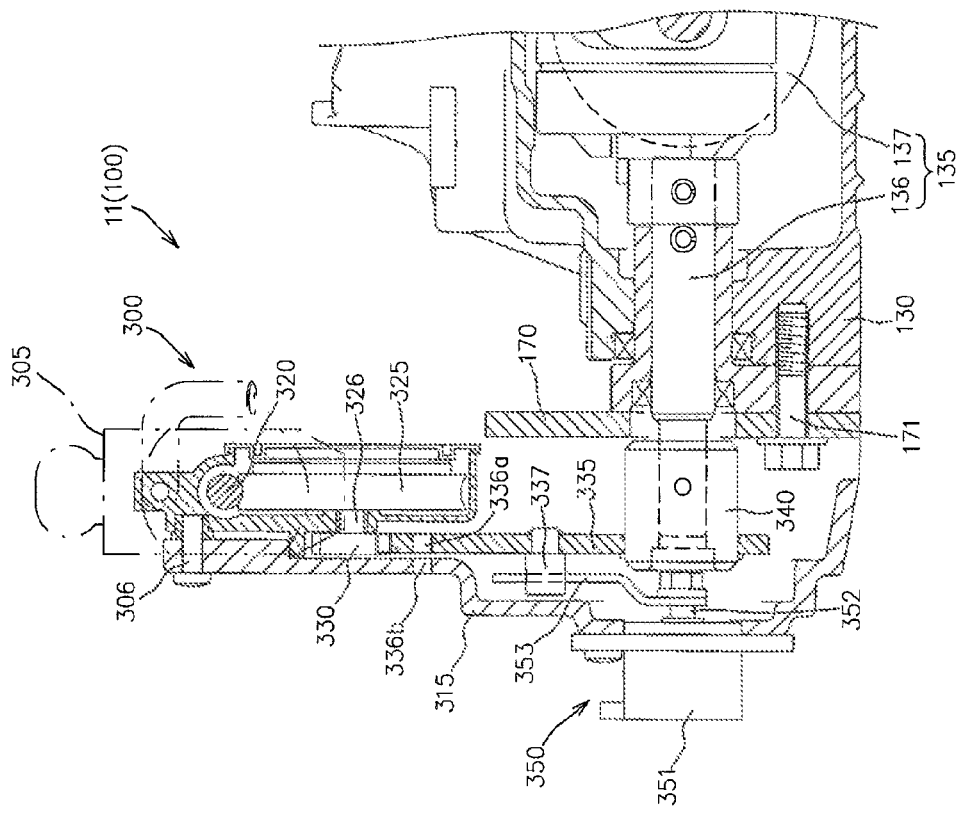
FIG. 8 is a cross sectional view taken along line VIII-VIII in FIG. 3A.

Furthermore, FIGS. 7 and 8 respectively show cross-sectional views taken along the lines VII-VII and VIII-VIII in FIG. 3A.

The electrically-operated motor 300 operatively drives the motor-side control shaft 136, and, as shown in FIGS. 6 and 7, includes an electrically-operated motor main body 301 whose drive is electrically controlled, an electrically-operated motor case 305 that accommodates the electrically-operated motor main body 301, and an electrically-operated motor main body output shaft 310 that is rotated about its axis by the electrically-operated motor main body 301.

The electrically-operated motor case 305 is detachably attached directly or indirectly to the first motor housing 130.

In the present embodiment, the electrically-operated motor case 305 is connected via an electrically-operated motor cover 315 to the first motor housing 130.

Specifically, as shown in FIGS. 6 and 8, the electrically-operated hydraulic actuator unit 100 further has the electrically-operated motor cover 315 to which the electrically-operated motor case 305 can be connected and that is connected to the first motor housing 130.

In the present embodiment, as shown in FIGS. 3A and 6 to 8, a plate member 170 having an opening through which the first end portion of the motor-side control shaft 136 is inserted is detachably connected via a fastening member 171 such as a bolt to the first motor housing 130.

Furthermore, the electrically-operated motor cover 315 is detachably connected via fastening members 316 such as bolts to the plate member 170 in a state in which the electrically-operated motor case 305 is connected via fastening members 306 such as bolts to the electrically-operated motor cover 315.

The present embodiment is configured such that, upon attachment of the electrically-operated motor 300 to the first motor housing 130, the electrically-operated motor main body output shaft 310 is operatively linked to the first end portion of the motor-side control shaft 136.

That is to say, according to rotation of the electrically-operated motor main body output shaft 310, the motor-side control shaft 136 rotates about its axis, and, thus, the volume of the first hydraulic motor main body 120 is changed.

With the thus configured electrically-operated hydraulic actuator unit 100, the motor-side volume adjusting mechanism 135 can be actuated according to a manual operation on the steering operation member 65, by electrically controlling the electrically-operated motor main body 301 according to the amount of manual operation on a steering operation member 65, without mechanically operatively linking the steering operation member 65 and the motor-side volume adjusting mechanism 135.

Accordingly, without any complicated mechanical link structure, the volume of the first hydraulic motor main body 120 can be changed according to a manual operation on the steering operation member 65.

Figure 9:
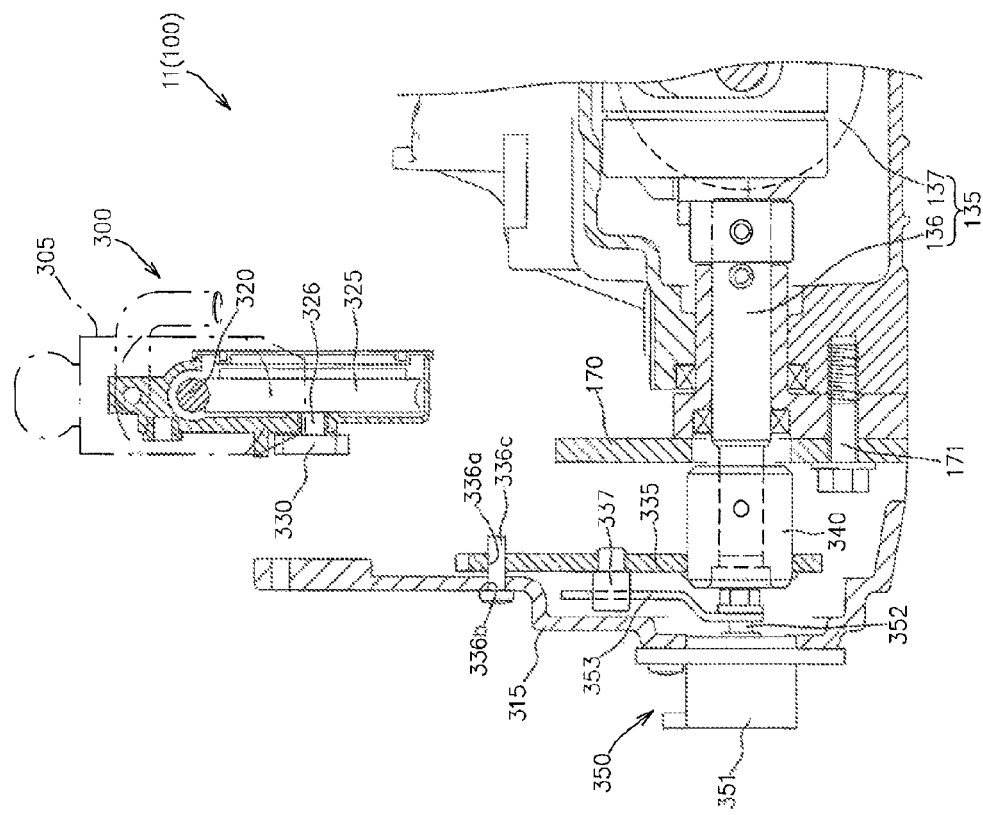
FIG. 9 is an exploded view of FIG. 8.

FIG. 9 shows an exploded cross-sectional view in which the electrically-operated motor 300 has been separated from the electrically-operated motor cover 315.

As shown in FIGS. 6 to 9, the electrically-operated motor 300 is linked to the motor-side volume adjusting mechanism 135, via an operating shaft 340 that is connected to the motor-side volume adjusting mechanism 135, and a sector gear 335 that is connected to the operating shaft 340.

Specifically, the operating shaft 340 is connected to the first end portion of the motor-side control shaft 136 in a relatively non-rotatable manner about its axis.

The sector gear 335 is projected in a direction orthogonal to the motor-side control shaft 136 in a state where its base end portion is connected to the operating shaft 340, and is provided with a gear at a free end portion thereof.

Meanwhile, as shown in FIG. 6, the electrically-operated motor 300 has, in addition to the above-described constituent components, a worm shaft 320 that is operatively connected to the electrically-operated motor main body output shaft 310, a power transmission gear 325 that meshes with the worm shaft 320, a power transmission shaft 326 that supports the power transmission gear 325 in a relatively non-rotatable manner about this shaft, and a power transmission motor output gear 330 that is supported on the power transmission shaft 326 in a relatively non-rotatable manner about this shaft, wherein, when the electrically-operated motor case 305 is connected to the electrically-operated motor cover 315, the power transmission motor output gear 330 meshes with the sector gear 335.

With this configuration, the electrically-operated motor main body output shaft 310 can be reliably operatively linked to the motor-side control shaft 136 when the electrically-operated motor 300 is attached to the electrically-operated motor cover 315, and the electrically-operated motor 300 can be easily attached to and detached from the electrically-operated motor cover 315.

Preferably, as shown in FIG. 6, the electrically-operated hydraulic actuator unit 100 can be provided with a first adjustment screw 341 that is screwed into a fixed member such as the electrically-operated motor cover 315 such that a tip end portion of the first adjustment screw 341 abuts against the sector gear 335 to define a swing end of the sector gear 335 about the operating shaft 340 in one direction, and a second adjustment screw 342 that is screwed into the fixed member such that a tip end portion of the second adjustment screw 342 abuts against the sector gear 335 to define a swing end of the sector gear 335 about the operating shaft 340 in the other direction.

With the first and the second adjustment screws 341 and 342, the range in which the volume of the first hydraulic motor 120 is allowed to change can be accurately set requiring as few additional constituent components as possible.

In the present embodiment, as shown in FIG. 6, the electrically-operated motor cover 315 is used as the fixed member. However, it will be appreciated that the first motor housing 130 or the plate member 170 that is fixed to the first motor housing 130 also may be used as the fixed member.

In the present embodiment, as shown in FIGS. 6 to 9, the sector gear 335 is provided with a through hole 336a passing through the sector gear 335 in the axial direction of the operating shaft 340, and the electrically-operated motor cover 315 is provided with a fixing hole 336b at a position where it faces the through hole 336a when the sector gear 335 is at a predetermined position about the operating shaft 340.

With this configuration, when a malfunction of the electrically-operated motor 300 or the like occurs, as shown in FIG. 9, the electrically-operated motor 300 is detached from the electrically-operated motor cover 315 and a fixing pin 336c is inserted through the through hole 336a and the fixing hole 336b, and, thus, the sector gear 335 can be fixed at the predetermined position about the operating shaft 340 so that the volume of the first hydraulic motor main body 120 can be fixed at a predetermined volume corresponding to the predetermined position.

Preferably, the fastening members 306 can be used as the fixing pin 336c. That is to say, the fastening members 306 removed when the electrically-operated motor 300 is detached from the electrically-operated motor cover 315 can be used as the fixing pin 336c that is inserted through the through hole 336a and the fixing hole 336b.

As shown in FIGS. 3A, 8, and 9, the electrically-operated hydraulic actuator unit 100 according to this embodiment further has a sensor unit 350 that detects the amount of rotation of the operating shaft 340 about its axis.

Specifically, as shown in FIGS. 6 to 9, the sensor unit 350 has a sensor housing 351 that is attached to the electrically-operated motor cover 315, a sensor shaft 352 that is supported on the sensor housing 351 in a rotatable manner about its axis so as to be positioned coaxially with the operating shaft 340 in a state in which the electrically-operated motor cover 315 is connected to the first motor housing 130, a sensor arm 353 that has a base end portion connected to the sensor shaft 352 and extends in a direction orthogonal to the operating shaft 340, a biasing member (not shown) that biases a detected body formed by the sensor shaft 352 and the sensor arm 353, in one direction about the axis of the sensor shaft 352, and a sensor main body (not shown) that detects the amount of rotation of the sensor shaft 352 about its axis.

Furthermore, the sector gear 335 is provided with an engagement pin 337 that is projected parallel to the operating shaft 340, and becomes engaged with the sensor arm 353 biased by the biasing member in one direction about the axis of the sensor shaft 352 when the electrically-operated motor cover 315 including the sensor unit 350 is connected to the first motor housing 130.

With this configuration, when the electrically-operated motor cover 315 to which the electrically-operated motor 300 and the sensor unit 350 have been attached is connected to the first motor housing 130, the sensor arm 353 can be engaged with the engagement pin 337 such that the sensor arm 353 rotates about the sensor shaft 352 according to rotation of the sector gear 335 about the operating shaft 340.

Furthermore, when the electrically-operated motor cover 315 to which the electrically-operated motor 300 and the sensor unit 350 have been attached is detached from the first motor housing 130, the sensor arm 353 is allowed to relatively move along the axial direction of the sensor shaft 352 with respect to the engagement pin 337.

Accordingly, while the position of the sector gear 335 about the operating shaft 340 (i.e., the position of the motor-side control shaft 136 about its axis) is being detected by the sensor unit 350, the electrically-operated motor cover 315 to which the electrically-operated motor 300 and the sensor unit 350 have been still attached can be easily detached from the first motor housing 130.

As shown in FIG. 6, the electrically-operated hydraulic actuator unit 100 according to the present embodiment is further provided with a clutch mechanism 360 that is interposed between the electrically-operated motor 300 and the motor-side volume adjusting mechanism 135, more specifically, between the electrically-operated motor main body output shaft 310 and the worm shaft 320, in order to allow a rotational driving power to be transmitted from the electrically-operated motor main body output shaft 310 to the worm shaft 320, while preventing the rotational driving power from being transmitted in the opposite direction.

FIG. 10 shows a vertical cross-sectional view of the clutch mechanism 360 taken along the line X-X in FIG. 6.

Figure 11A:
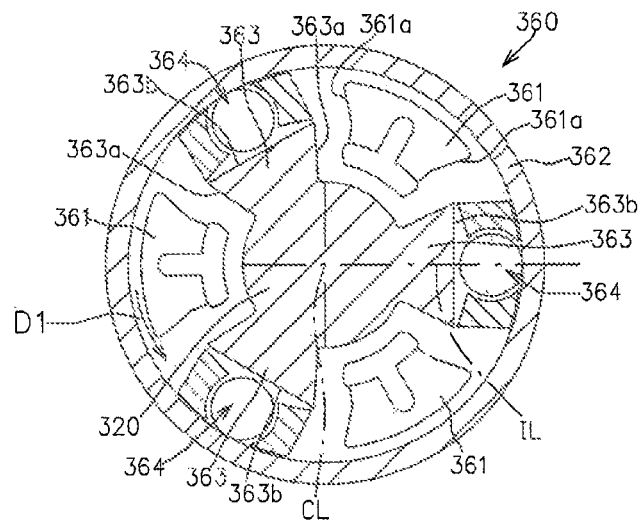
FIG. 11 is a cross sectional view taken along line XI-XI in FIG. 10.
Figure 11B:
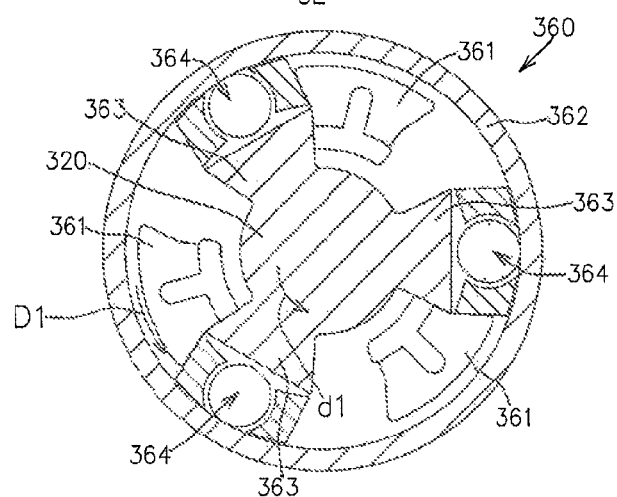

Furthermore, FIG. 11 shows a horizontal cross-sectional view of the clutch mechanism 360 taken along the line XI-XI in FIG. 10.

As shown in FIGS. 10 and 11, the clutch mechanism 360 has a driving-side arm 361 (corresponding to a driving-side member) that is provided at a tip end portion of the electrically-operated motor main body output shaft 310 so as to be projected outward in radial directions, a clutch case 362 that surrounds the driving-side arm 361, a driven-side arm 363 (corresponding to a driven-side member) that is provided at an end portion of the worm shaft 320 on the side facing the electrically-operated motor main body output shaft 310 so as to be projected outward in radial directions, and contact members 364 that are arranged between the driven-side arm 363 and the clutch case 362 in the radial directions with respect to the axis of the electrically-operated motor main body output shaft 310 and the worm shaft 320.

The driving-side arm 361 is configured such that side faces 361a oriented in the circumferential direction with respect to an axis CL (corresponding to a clutch reference axis) of the electrically-operated motor main body output shaft 310 can press, in the circumferential direction, respective side faces 363a and 364a oriented in the circumferential direction of the driven-side arm 363 and the contact members 364.

When viewed along the axis CL of the electrically-operated motor main body output shaft 310 and the worm shaft 320, outer end faces 363b of the driven-side arm 363 oriented outward in the radial direction each have a circumferential center portion in which the distance to the axis CL is smaller than a distance L from the contact member 364 to the axis CL and a circumferential outer portion in which the distance is larger than the distance L.

The outer end faces 363b each having the circumferential center portion and the circumferential outer portion may be configured such that the outer end faces 363b are each substantially orthogonal to a virtual line IL connecting the center point in the circumferential direction of the outer end face 363b and the axis CL.

The thus configured clutch mechanism 360 is actuated as follows.

When the electrically-operated motor main body 301 is rotated either in one direction about its axis (e.g., in a forward rotating direction for causing the work vehicle 1 to travel forward) or in the other direction (e.g., in a reverse direction for causing the work vehicle 1 to travel in reverse) (hereinafter, referred to as a "first direction D1") (see FIG. 11A), the driving-side arm 361 presses both the driven-side arm 363 and the contact members 364 in the first direction D1. Accordingly, the worm shaft 320 rotates in a direction d1, which is the same as the first direction D1 (see FIG. 11B), the movable swash plate 137 slants in a direction corresponding to the first direction D1.

Incidentally, the pressure of an operating fluid supplied or discharged by the first hydraulic motor 120 functions on the movable swash plate 137 as a force that slants the movable swash plate 137 to the neutral side (neutral direction, lower volume side). Furthermore, as necessary, the electrically-operated hydraulic actuator unit 100 includes a neutral spring that biases the movable swash plate 137 to the neutral side.

Accordingly, if the biasing force is larger than the force of inertia of the electrically-operated motor 300, when the electrically-operated motor 300 is put in a non-actuated state (the state in which the rotation of the electrically-operated motor main body output shaft 310 is stopped), the movable swash plate 137 slants by a slight amount to the neutral side against the force of inertia of the electrically-operated motor 300.

Figure 11C:
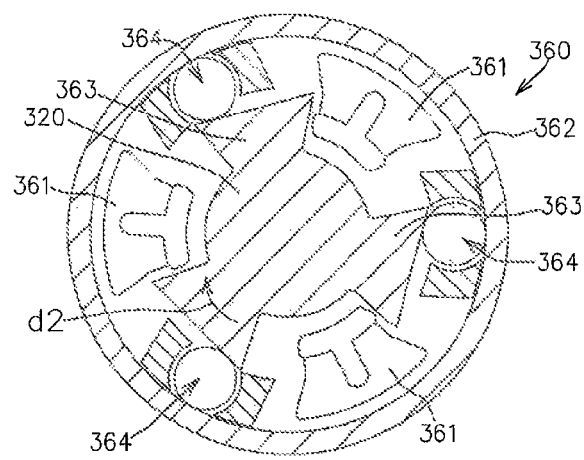

Accordingly, as shown in FIG. 11C, the worm shaft 320 operatively linked to the movable swash plate 137 rotates in a second direction d2 corresponding to a direction toward the neutral side. However, the contact members 364 are in an unengaged state, and therefore the position of the contact members 364 is not changed.

As described above, when viewed along the axis CL of the worm shaft 320, the outer end faces 363b of the driven-side arm 363 each have the circumferential center portion in which the distance to the axis CL is smaller than the distance L from the contact member 364 to the axis CL and the circumferential outer portion in which the distance is larger than the distance L. Accordingly, when the driven-side arm 363 rotates in the second direction d2, the contact members 364 are pressed against the inner circumferential surface of the clutch case 362, and, thus, the worm shaft 320 is put in a locked state in which it is not allowed to rotate (see FIG. 11C).

Accordingly, after the movable swash plate 137 is moved by the electrically-operated motor 300 to a predetermined slanting position, the movable swash plate 137 can be reliably prevented from unintentionally slanting from the predetermined slanting position.

Hereinafter, a method for controlling the electrically-operated motor 300 by the control apparatus 90 will be described.

As described above, the electrically-operated hydraulic actuator unit 100 that operatively drives the first wheels 10 and the second hydraulic motor unit 200 that operatively drives the second wheels 20 are hydraulically driven in a synchronized manner with each other by the hydraulic pump unit 50, and the turning radius R1 of the first wheels 10 becomes smaller than the turning radius R2 of the second wheels 20 as the turning angle of the vehicle increases.

The control apparatus 90 controls actuation of the electrically-operated motor 300 such that the speed of the first wheels 10 driven by the electrically-operated hydraulic actuator unit 100 changes according to the difference between the turning radiuses of the first and the second wheels 10 and 20.

Specifically, the motor-side volume adjusting mechanism 135 of the electrically-operated hydraulic actuator unit 100 is configured so as to be capable of changing the volume of the first hydraulic motor 120 within a range including a reference volume at which the circumferential speed of the first wheels 10 operatively driven by the first hydraulic motor 120 is substantially the same as the circumferential speed of the second wheel pair 20 operatively driven by the second hydraulic motor 220 and a first volume that is larger than the reference volume.

For example, if the first wheel pair 10 and the second wheel pair 20 have the same diameter, the reference volume is the same as the fixed volume of the second hydraulic motor 220.

Preferably, the first volume is a volume for reducing the circumferential speed of the first wheel pair 10 by a speed according to the difference between the turning radiuses of the first and the second wheel pairs 10 and 20, which occurs when the work vehicle 1 is turning at the maximum turning angle.

The control apparatus 90 actuates the electrically-operated motor 300 such that the volume of the first hydraulic motor 120 has a volume according to the turning angle of the vehicle between the reference volume and the first volume, based on a turning angle signal from a turning angle sensor included in the work vehicle 1.

More specifically, the control apparatus 90 actuates the electrically-operated motor 300 such that the volume of the first hydraulic motor 120 is the first volume when the vehicle 1 is turning at the maximum turning angle, and such that the volume of the first hydraulic motor 120 is a volume according to the turning angle of the vehicle between the reference volume and the first volume when the vehicle 1 is turning at a turning angle larger than that in straight-ahead traveling state and smaller than the maximum turning angle.

Specifically, the control apparatus 90 includes a computing portion (hereinafter, referred to as a "CPU") that has control computation means for performing various computing processes, and a storage portion that has a ROM for storing control programs, control data, and the like, an EEPROM for saving set values and the like such that they are not lost even when power is removed and allowing the set values and the like to be rewritten, a RAM for temporarily storing data generated during computation by the CPU, and the like.

The storage portion stores control data related to an actuation state of the electrically-operated motor 300 with respect to a turning angle, and the CPU performs computing processes for controlling actuation of the electrically-operated motor 300 based on the turning angle information output from a sensor such as the turning angle sensor and the control data.

The control data may be, for example, in the form of a conversion formula for control, a LUT (look-up table), or the like.

The turning angle sensor may be an operation-side turning angle sensor 66 that detects the operation angle of the steering operation member 65 (see FIG. 2) or an actuation-side turning angle sensor that detects the turning angle of the first frame 31 with respect to the second frame 32.

Furthermore, in a work vehicle in which a front wheel pair and a rear wheel pair are respectively supported on a front portion and a rear portion of a rigid vehicle frame and one of the front wheel pair and the rear wheel pair is used as a steering wheel pair, the actuation-side turning angle sensor is configured so as to detect the steering angle of the steering wheel pair.

Figure 12:
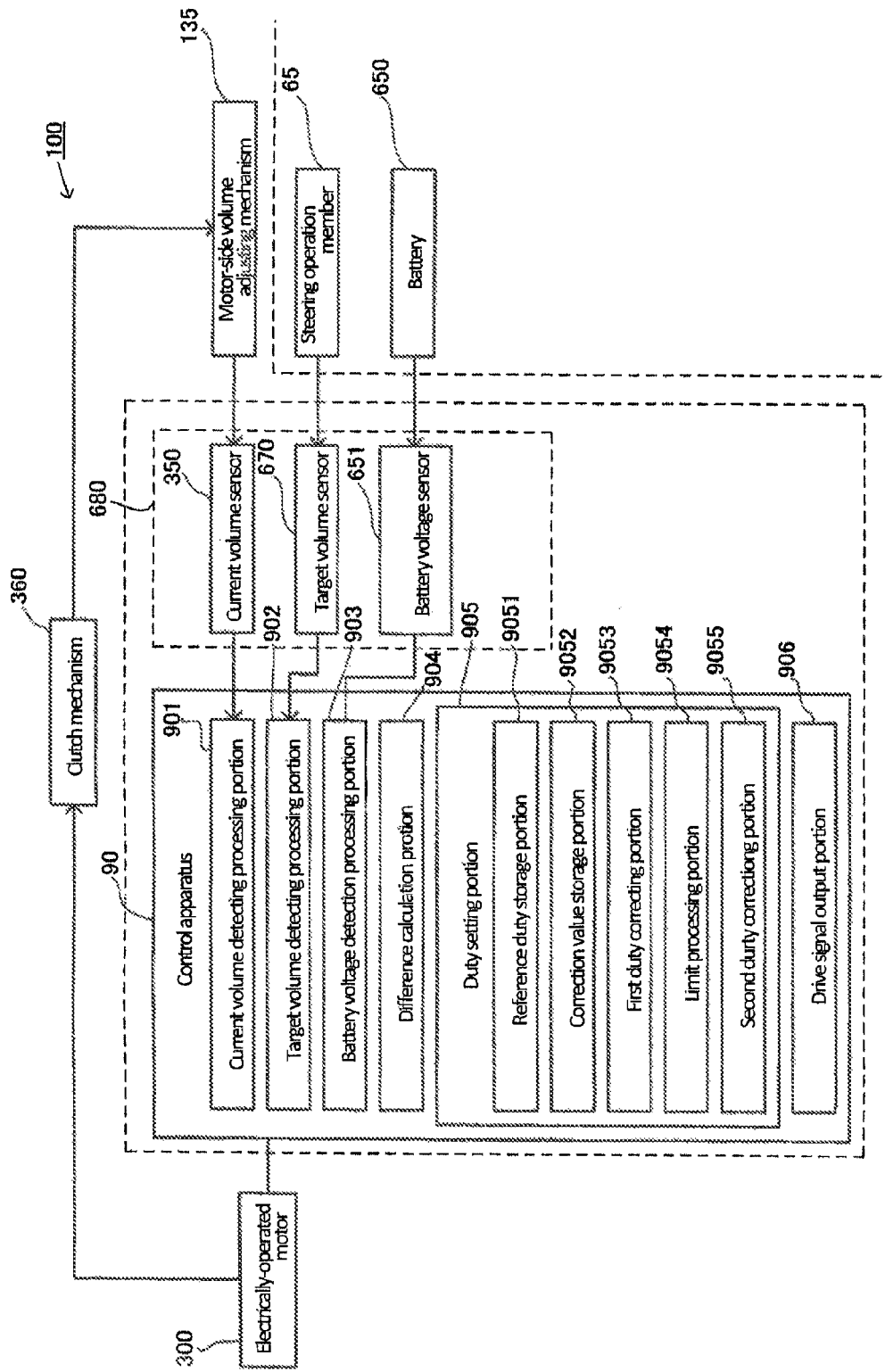
FIG. 12 is a block diagram showing an electrical configuration of an electrically-operated hydraulic actuator unit.

FIG. 12 is a block diagram showing an electrical configuration of the electrically-operated hydraulic actuator unit 100 according to the present embodiment functioning as the first hydraulic motor unit.

As shown in FIG. 12, the electrically-operated hydraulic actuator unit 100 has a sensor portion 680, in addition to the first hydraulic motor 120, the electrically-operated motor 300, and the control apparatus 90. The sensor portion 680 is electrically connected to the control apparatus 90, and has a current volume sensor 350, a target volume sensor 670, and a battery voltage sensor 651.

The current volume sensor 350 is for detecting a current volume of the electrically-operated hydraulic actuator unit 100 (hereinafter, referred to as a "current volume"), and outputs a signal according to the current volume.

In the present embodiment, the current volume sensor 350 is, for example, the sensor unit 350 that detects the amount of rotation of the operating shaft 340 about its axis. Note that the current volume sensor 350 is not limited to the sensor unit 350, and may be a sensor that detects a parameter in one-to-one correspondence with the current volume, such as the rotational position of the motor-side control shaft 136 about its axis or the slanting position of the motor-side movable swash plate 137 about its swing axis.

The target volume sensor 670 is for detecting a target volume of the electrically-operated hydraulic actuator unit 100 (hereinafter, referred to as a "target volume"), and outputs a signal according to the target volume.

In the present embodiment, the target volume sensor 670 is a turning angle sensor such as the turning operation-side sensor 66, but there is no limitation to this.

The battery voltage sensor 651 is for detecting a voltage of a battery 650 (an electrical power source of the electrically-operated motor 300) mounted in the work vehicle 1 (hereinafter, referred to as "battery voltage"), and outputs a signal according to the battery voltage.

The control apparatus 90 includes the CPU and the storage portion, and controls the sensor portion 680 and the electrically-operated motor 300 (the motor-side volume adjusting mechanism 135) in association with each other as follows.

In the present embodiment, when the motor-side volume adjusting mechanism 135 is actuated by the electrically-operated motor 300, the electrically-operated motor 300 is actuated such that the volume matches the target volume indicated by the signal output from the target volume sensor 670.

Assuming that a period from when actuation of the motor-side volume adjusting mechanism 135 is started until when the volume of the electrically-operated hydraulic actuator unit 100 reaches the target volume is referred to as an actuation period, an actuation period in the case of actuation of the motor-side volume adjusting mechanism 135 to the neutral side and an actuation period in the case of actuation to the higher volume side are each divided into a predetermined start period in which the time when the actuation is started is taken as a starting point and an ordinary actuation period, and the actuation of the electrically-operated motor 300 is controlled in an appropriate manner for each period.

That is to say, in the electrically-operated hydraulic actuator unit 100 according to the present embodiment, a biasing force to the neutral side is acting on the motor-side volume adjusting mechanism 135, and, thus, a necessary operating torque that is to be output to the motor-side volume adjusting mechanism 135 differs between the actuation to the neutral side and the actuation to the higher volume side.

Furthermore, when starting the actuation of the motor-side volume adjusting mechanism 135, the locked state of the clutch mechanism 360 has to be canceled. Accordingly, for example, even in the case of actuation to the neutral side, the necessary operating torque differs between a short period (start period) from the start of the actuation until a predetermined time has passed and an ordinary actuation period after the start period. The same is applied to the case of actuation to the higher volume side.

Figure 13:
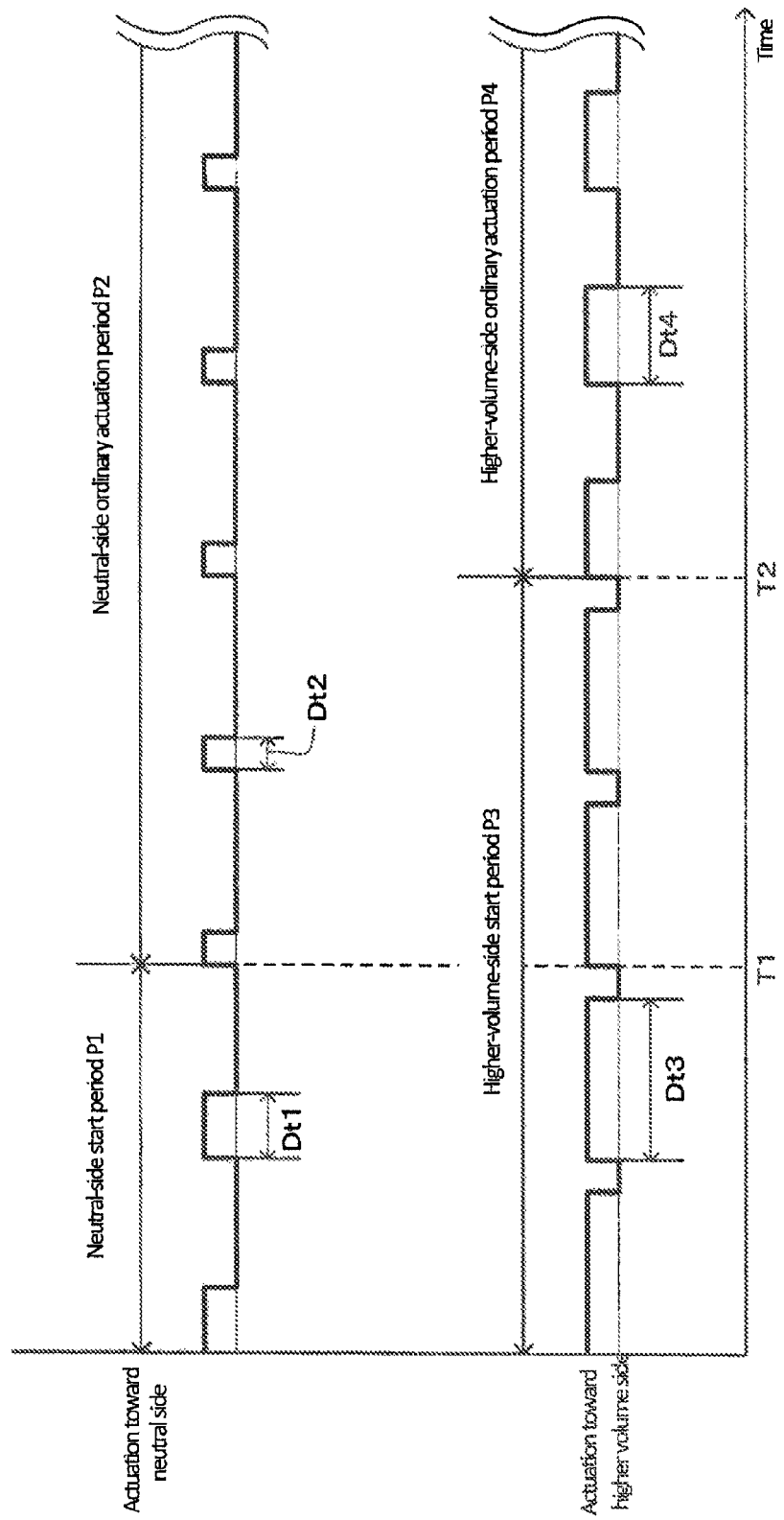
FIG. 13 is a figure showing wave examples of profiles of driving signals (driving pulses) to be output to the electrically-operated motor in a neutral-side start period P1, a neutral-side ordinary drive period P2, a higher-volume-side start period P3 and a higher-volume-side ordinary drive period P4.

In consideration of this aspect, in the present embodiment, as shown in FIG. 13, a continuous actuation period of the motor-side volume adjusting mechanism 135 to the neutral side is divided into a neutral-side start period P1 having a predetermined length (time) in which the time when the actuation to the neutral side is started is taken as a starting point and a neutral-side ordinary actuation period P2 after the neutral-side start period P1. Furthermore, a continuous actuation period to the higher volume side is divided into a higher-volume-side start period P3 having a predetermined length (time) in which the time when the actuation to the higher volume side is started is taken as a starting point and a higher-volume-side ordinary actuation period P4 after the higher-volume-side start period P3. The duty of drive signal (drive pulse) is set such that respective operating torque are generated by the electrically-operated motor 300 for the periods P1 to P4.

Note that, in the description below, drive signals (drive pulses) that are to be output to the electrically-operated motor 300 in the neutral-side start period P1, the neutral-side ordinary drive period P2, the higher-volume-side start period P3, and the higher-volume-side ordinary drive period P4 are respectively referred to as first to fourth drive signals.

In order to realize such control, the control apparatus 90 causes the CPU to execute a program unique to the present embodiment stored in the storage portion, thereby functioning as a current volume detection processing portion 901, a target volume detection processing portion 902, a battery voltage detection processing portion 903, a difference calculating portion 904, a duty setting portion 905, and a drive signal output portion 906.

The current volume detection processing portion 901 performs a process that detects the current volume of the electrically-operated hydraulic actuator unit 100 based on the signal output from the current volume sensor 350. The current volume sensor 350 and the current volume detection processing portion 901 form a current volume detecting portion.

The target volume detection processing portion 902 performs a process that detects the target volume of the electrically-operated hydraulic actuator unit 100 (hereinafter, referred to as a "target volume") based on the signal output from the target volume sensor 670. The target volume sensor 670 and the target volume detection processing portion 902 form a target volume detecting portion.

The battery voltage detection processing portion 903 performs a process that detects the battery voltage based on the signal output from the battery voltage sensor 651. The battery voltage sensor 651 and the battery voltage detection processing portion 903 form a battery voltage detecting portion.

The difference calculating portion 904 calculates a difference D between the current volume and the target volume. In the present embodiment, the difference calculating portion 904 calculates (Target volume−Current volume) as the difference D. For example, if the target volume corresponds to a position obtained by rotating the operating shaft 340 about its axis by 30 degrees from a predetermined reference position that causes the motor-side volume adjusting mechanism 135 to be in the neutral state, and the current volume corresponds to a position obtained by rotating the operating shaft 340 by 10 degrees from the reference position, the difference calculating portion 904 obtains 20 (=30−10) degrees as the difference D.

The duty setting portion 905 sets the duties of the first to the fourth drive signals that are to be output to the electrically-operated motor 300.

The duty setting portion 905 first determines whether the direction in which the motor-side volume adjusting mechanism 135 is to be actuated is the higher volume side or the neutral side, based on the difference D calculated by the difference calculating portion 904, and sets either a set of the duties of the first and the second drive signals or a set of the duties of the third and the fourth drive signals according to the determination result.

Specifically, assuming that the difference D is obtained as (Target volume–Current volume) as described above, the duty setting portion 905 determines that the direction in which the motor-side volume adjusting mechanism 135 is to be actuated is the higher volume side if the difference D is a positive value, and determines that the direction in which the motor-side volume adjusting mechanism 135 is to be actuated is the neutral side if the difference D is a negative value.

Furthermore, if it is determined that the direction in which the motor-side volume adjusting mechanism 135 is to be actuated is the neutral side, the duty setting portion 905 sets a duty (first duty) Dt1 of the first drive signal that is to be output to the electrically-operated motor 300 in the neutral-side start period P1 and a duty (second duty) Dt2 of the second drive signal that is to be output to the electrically-operated motor 300 in the neutral-side ordinary drive period P2 after the neutral-side start period P1.

On the other hand, if it is determined that the direction in which the motor-side volume adjusting mechanism 135 is to be driven is the higher volume side, the duty setting portion 905 sets a duty (third duty) Dt3 of the third drive signal that is to be output to the electrically-operated motor 300 in the higher-volume-side start period P3 and a duty (fourth duty) Dt4 of the fourth drive signal that is to be output to the electrically-operated motor 300 in the higher-volume-side ordinary drive period P4 after the higher-volume-side start period P3.

The duty setting portion 905 has a timer (not shown), and actuates the timer when the actuation is started, thereby determining the current period based on a current measurement value of the timer (measurement time).

That is to say, based on the current measurement value of the timer, the duty setting portion 905 determines whether the current point in time is in the neutral-side start period P1 or in the neutral-side ordinary drive period P2 at the time of actuation of the motor-side volume adjusting mechanism 135 to the neutral side, or determines whether the current point in time is in the higher-volume-side start period P3 or in the higher-volume-side ordinary drive period P4 at the time of actuation to the higher volume side.

The lengths (times) of the neutral-side start period P1 and the higher-volume-side start period P3 are determined in advance. Furthermore, in the present embodiment, as shown in FIG. 13, the higher-volume-side start period P3 is set as a period having a time T2, which is longer than a time T1 of the neutral-side start period P1.

The duty setting portion 905 determines the current period (described above) and sets the duty (described below), for example, in predetermined cycles. Hereinafter, a method for setting the first to the fourth duties Dt1 to Dt4 will be described.

As shown in FIG. 12, the duty setting portion 905 has the functions of a reference duty storage portion 9051, a correction value storage portion 9052, a first duty correcting portion 9053, a limit processing portion 9054, and a second duty correcting portion 9055, and sets the first to the fourth duties Dt1 to Dt4 using the portions 9051 to 9055.

The reference duty storage portion 9051 stores in advance initial values of duties that have been preset for the first to the fourth drive signals as reference duties.

For example, as shown in FIG. 14, "Dtb1" is preset as a reference duty of the first drive signal that is to be output in the neutral-side start period P1, "Dtb2" is preset as a reference duty of the second drive signal that is to be output in the neutral-side ordinary drive period P2, "Dtb3" is preset as a reference duty of the third drive signal that is to be output in the higher-volume-side start period P3, and "Dtb4" is preset as a reference duty of the fourth drive signal that is to be output in the higher-volume-side ordinary drive period P4. Furthermore, the reference duty storage portion 9051 stores in advance a corresponding relationship between the periods P1 to P4 and the reference duties Dtb1 to Dtb4 in the form of a table.

The magnitude relationship between the reference duties Dtb1 to Dtb4 is set as follows.

$$Dtb1 > Dtb2 \tag{1}$$

$$Dtb3 > Dtb4 \tag{2}$$

$$Dtb4 > Dtb2 \tag{3}$$

$$Dtb3 > Dtb1 \tag{4}$$

As described above, when the actuation is started, the locked state of the clutch mechanism 360 has to be canceled both in the case of actuation of the motor-side volume adjusting mechanism 135 to the higher volume side and in the case of actuation to the neutral side. In order to cancel the locked state, an operating torque required becomes larger than the operating torque required for the ordinary actuation period.

In consideration of this aspect, in the present embodiment, as shown in the relational expression (1), the reference duty Dtb1 of the first drive signal that is to be output in the neutral-side start period P1 is set to be larger than the reference duty Dtb2 of the second drive signal that is to be output in the neutral-side ordinary drive period P2, and, as shown in the relational expression (2), the reference duty Dtb3 of the third drive signal that is to be output in the higher-volume-side start period P3 is set to be larger than the reference duty Dtb4 of the fourth drive signal that is to be output in the higher-volume-side ordinary drive period P4.

Furthermore, as described above, the motor-side volume adjusting mechanism 135 is biased to the neutral side. Accordingly, an operating torque required is larger in the case of actuation of the motor-side volume adjusting mechanism 135 to the higher volume side than in the case of actuation to the neutral side.

In consideration of this aspect, as shown in the relational expression (3), the reference duty Dtb4 of the fourth drive signal that is to be output in the higher-volume-side ordinary drive period P4 is set to be larger than the reference duty Dtb2 of the second drive signal that is to be output in the neutral-side ordinary drive period P2.

That is to say, in the configuration in which the fourth drive signal in the higher-volume-side ordinary drive period P4 is the same magnitude as the second drive signal in the neutral-side ordinary drive period P2 (i.e., is a drive signal having the same duty as the second duty), the torque output from the electrically-operated motor 300 may be insufficient as the operating torque necessary for actuating the motor-side volume adjusting mechanism 135 in the higher-volume-side ordinary drive period P4. According to the present embodiment, this problem can be effectively prevented from occurring.

Furthermore, as described above, the operating torque necessary for canceling the locked state in the case of actuation of the motor-side volume adjusting mechanism 135 to the higher volume side is larger, by a biasing force acting on the motor-side volume adjusting mechanism 135 to the neutral side, than the operating torque necessary for canceling the locked state in the case of actuation of the motor-side volume adjusting mechanism 135 to the neutral side. In consideration of this aspect, as shown in the relational expression (4), in the present embodiment, the reference duty Dtb3 of the third drive signal that is to be output in the higher-volume-side start period P3 is set to be larger than the reference duty Dtb1 of the first drive signal that is to be output in the neutral-side start period P1.

That is to say, in the configuration in which the third drive signal in the higher-volume-side start period P3 is the same magnitude as the first drive signal in the neutral-side start period P1 (i.e., is a drive signal having the same duty as the first duty), the torque output from the electrically-operated motor 300 may be insufficient as the operating torque necessary for actuating the motor-side volume adjusting mechanism 135 in the higher-volume-side start period P3. According to the present embodiment, this problem can be effectively prevented from occurring.

The correction value storage portion 9052 stores in advance a correction value α for correcting the reference duty according to the difference D calculated by the difference calculating portion 904.

For example, as shown in FIG. 15, in the present embodiment, the range of values 0 to DN that the difference D can take is divided into a plurality of ranges, a correction value "α1" is preset for the range "0 to D1" of the difference D, a correction value "α2" is preset for the range "D1 to D2", a correction value "α3" is preset for the range "D2 to D3", and a correction value "αN" is preset for the range "DN−1 to DN". Furthermore, the correction value storage portion 9052 stores in advance a corresponding relationship between the ranges 0 to D1, . . . , and DN−1 to DN of the difference D and the correction values α1, . . . , and αN in the form of a table.

When the difference calculating portion 904 calculates the difference D, the first duty correcting portion 9053 reads the correction value α associated with the difference D from the correction value storage portion 9052, and uses the read correction value to correct the reference duty associated with the current period among the periods P1 to P4.

For example, if the difference D calculated by the difference calculating portion 904 is "D21" (D2<D21<D3), the first duty correcting portion 9053 reads a correction value "α3" associated with the difference "D21" from the correction value storage portion 9052. Furthermore, if the current period is, for example, the higher-volume-side start period P3, the first duty correcting portion 9053 performs a correction that adds the correction value "α3" to the reference duty "Dtb3" associated with the higher-volume-side start period P3.

It is assumed that the correction value α increases as the difference D increases.

That is to say, assuming that the difference D is obtained as (Target volume−Current volume) as described above, the value (the correction value α) that is to be added to the duty is set to be larger as the current volume is smaller with respect to the target volume (as the difference D is larger), and the absolute value of the value (the correction value α) that is to be subtracted from the duty is set to be larger as the current volume is larger with respect to the target volume (as the difference D is smaller).

Figure 16:
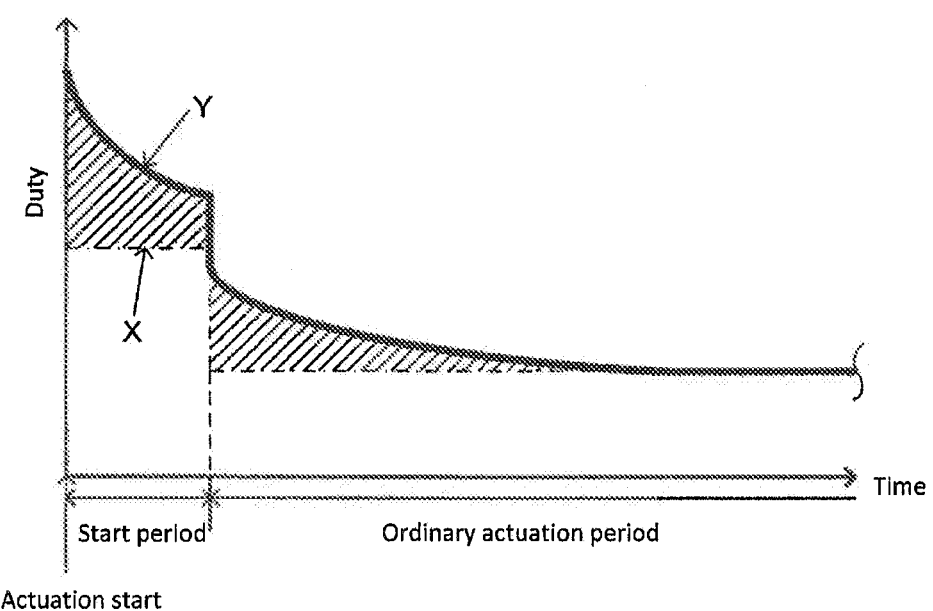
FIG. 16 is a graph showing one example (arrow X) regarding change in time sequence of the reference duty that is stored in the reference duty storage portion, and also showing one example (arrow Y) regarding change in time sequence of duties that have been corrected by a first duty correcting portion.

FIG. 16 shows an exemplary change over time of the reference duty stored in the reference duty storage portion 9051 (arrow X) and an exemplary change over time of the duty corrected by the first duty correcting portion 9053 (arrow Y) in the case of driving to the higher volume side (in the case where the current volume is smaller than the target volume).

In FIG. 16, the hatched portions indicate values (correction values) that are to be added to the reference duty.

If such a correction value α is used to correct the reference duty, the electrically-operated motor 300 can be actuated with an operating torque that is larger as the current volume is farther from the target volume. Accordingly, the rate of an increase in the rotational speed of the electrically-operated motor 300 can be increased as the current volume is farther from the target volume, and, thus, the time until the volume of the electrically-operated hydraulic actuator unit 100 reaches the target volume can be shortened compared with the case in which the reference duty is corrected using the correction value that is constant regardless of the magnitude of the difference D.

The first duty correcting portion 9053 generates information indicating the thus corrected duty as duty information, and outputs this duty information to the limit processing portion 9054 for the subsequent step.

If the duty information acquired from the first duty correcting portion 9053 indicates a duty exceeding 100(%), the limit processing portion 9054 converts that duty into (replaces the duty with) 100(%) and outputs duty information indicating the converted duty to the second duty correcting portion 9055 for the subsequent step. That is to say, the limit processing portion 9054 limits, to 100(%), the duty indicated by the duty information that is to be output to the second duty correcting portion 9055 for the subsequent step.

Note that, if the duty information acquired from the first duty correcting portion 9053 does not indicate a duty exceeding 100(%), the limit processing portion 9054 outputs the acquired duty information without any processing to the second duty correcting portion 9055 for the subsequent step.

The second duty correcting portion 9055 corrects the duty indicated by the duty information output from the limit processing portion 9054, according to the battery voltage detected by the battery voltage detection processing portion 903.

When the battery voltage changes, the voltage values (signal levels) of the first to the fourth drive signals that are to be output to the electrically-operated motor 300 are different from those when the battery voltage does not change. In this manner, when the voltage values of the first to the fourth drive signals change, even if the duty is constant, the electrical power of each drive signal, that is, the value of electrical power that is to be supplied to the electrically-operated motor 300 changes, and, thus, the operating torque and the like from the electrically-operated motor 300 become offset from nominal values. That is to say, the control performance of the electrically-operated motor 300 changes. In particular, when the battery voltage becomes larger than the nominal value, the operating torque becomes larger than the nominal value, the volume of the hydraulic pump 52 increases to be larger than the target volume, which is particularly problematic.

Figure 17:
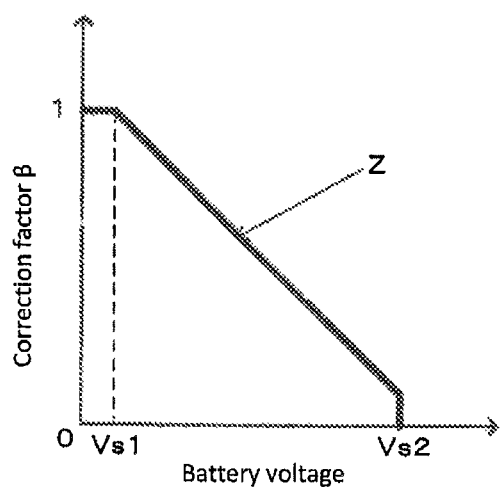
FIG. 17 is a graph showing a relationship between a battery voltage Vs and a correction factor β for correcting a duty defined by duty information that is output from a limit processing portion.

Thus, in the present embodiment, the second duty correcting portion 9055 corrects the duty indicated by the duty information output from the limit processing portion 9054, using a table (not shown). This table prescribes a relationship between a battery voltage Vs detected by the battery voltage detection processing portion 903, and a correction factor β used by the second duty correcting portion 9055 to correct the duty indicated by the duty information output from the limit processing portion 9054. FIG. 17 is a graph showing the relationship between the battery voltage Vs and the correction factor β prescribed in the table. Note that, in FIG. 17, the horizontal axis indicates the battery voltage Vs, and the vertical axis indicates the correction factor β.

As shown in FIG. 17, if the battery voltage Vs is in the range of 0 to Vs1, where the value is relatively small, the correction factor β is set at "1".

Meanwhile, if the battery voltage Vs is in the range of Vs1 to Vs2, the correction factor β is set at values plotted as a line segment indicated by the arrow Z. The correction factor β at that time is set so as to become smaller in proportion to an increase in the battery voltage Vs as shown in FIG. 17, in order to avoid the above-described problem in which, when the battery voltage becomes larger than the nominal value, the operating torque becomes larger than the nominal value, and the volume of the hydraulic pump 52 increases to be larger than the target volume.

The second duty correcting portion 9055 extracts from the table the correction factor β associated with the battery voltage Vs detected by the battery voltage detection processing portion 903, and multiplies the duty indicated by the duty information output from the limit processing portion 9054 by the correction factor β.

For example, assuming that the current battery voltage Vs is detected to be 15 (V) and the correction factor β associated with this battery voltage is 0.6, if the duty indicated by the duty information output from the limit processing portion 9054 is 60(%), the second duty correcting portion 9055 corrects the duty "60(%)" into "36 (=60×0.6)".

With this processing, the control performance of the electrically-operated motor 300 can be prevented from being changed.

If the duty corrected according to the battery voltage Vs is for the first drive signal, the second duty correcting portion 9055 takes the corrected duty as the first duty Dt1, and outputs duty information indicating this duty to the drive signal output portion 906 for the subsequent step.

In a similar manner, if the duty corrected according to the battery voltage Vs is for the second drive signal, the second duty correcting portion 9055 takes the corrected duty as the second duty Dt2 and outputs duty information indicating this duty to the drive signal output portion 906 for the subsequent step. If the corrected duty is for the third drive signal, the second duty correcting portion 9055 takes the corrected duty as the third duty Dt3 and outputs duty information indicating this duty to the drive signal output portion 906 for the subsequent step. If the corrected duty is for the fourth drive signal, the second duty correcting portion 9055 takes the corrected duty as the fourth duty Dt4 and outputs duty information indicating this duty to the drive signal output portion 906 for the subsequent step.

The drive signal output portion 906 generates drive signals having a predetermined cycle based on the duty information output from the second duty correcting portion 9055, and outputs them to the electrically-operated motor 300.

That is to say, the drive signal output portion 906 generates the first drive signal having the duty Dt1 and outputs it to the electrically-operated motor 300 if the duty information acquired from the duty setting portion 905 indicates the duty Dt1 for the first drive signal, generates the second drive signal having the duty Dt2 and outputs it to the electrically-operated motor 300 if the duty information indicates the duty Dt2 for the second drive signal, generates the third drive signal having the duty Dt3 and outputs it to the electrically-operated motor 300 if the duty information indicates the duty Dt3 for the third drive signal, and generates the fourth drive signal having the duty Dt4 and outputs it to the electrically-operated motor 300 if the duty information indicates the duty Dt4 for the fourth drive signal.

Figure 18:
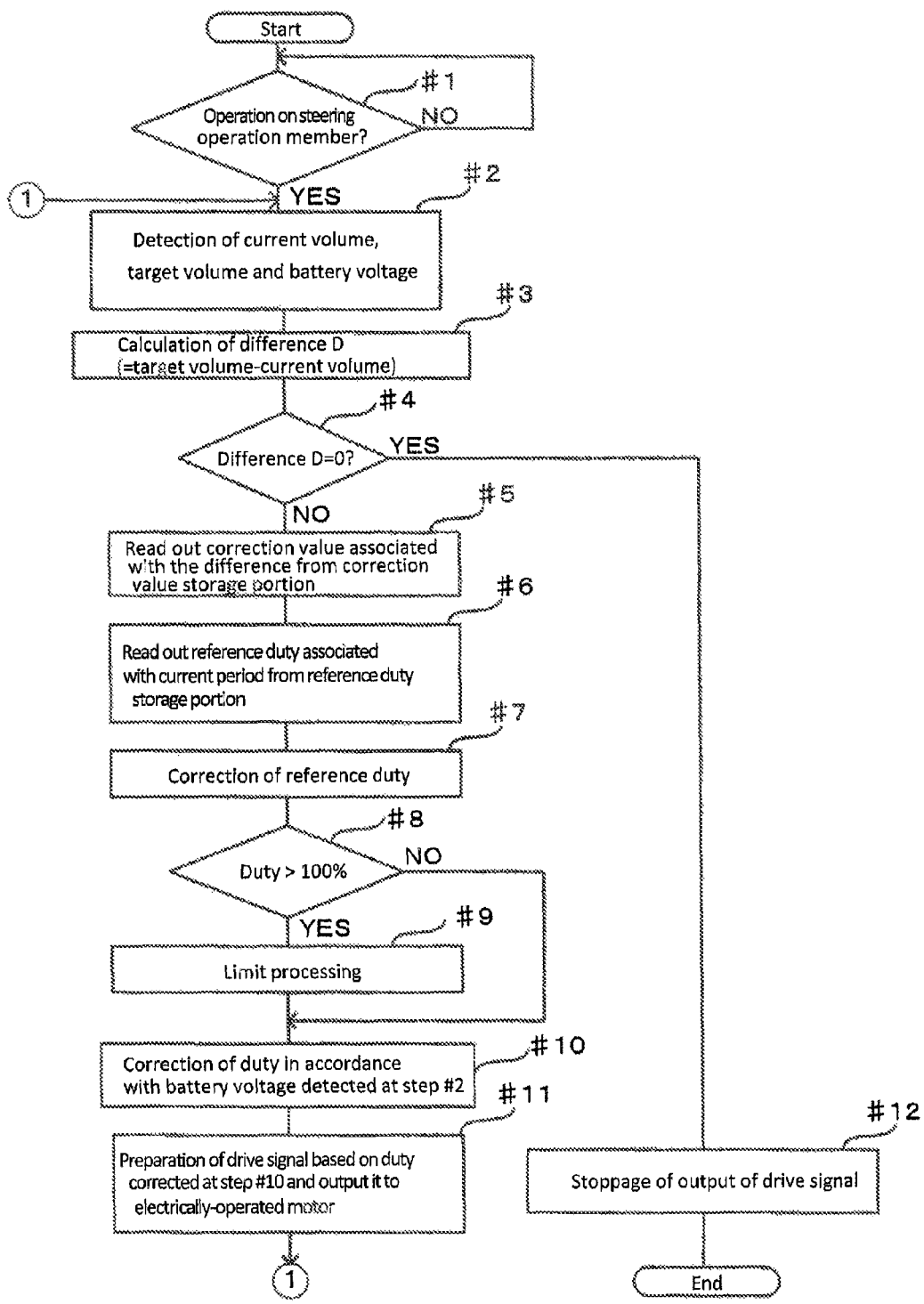
FIG. 18 is a flowchart showing a process by a control apparatus.

FIG. 18 is a flowchart showing the process by the control apparatus 90.

As shown in FIG. 18, if the steering operation member 65 is operated (YES in Step #1), the current volume detection processing portion 901 performs a process that detects the current volume of the electrically-operated hydraulic actuator unit 100 based on the signal output from the current volume sensor 350, the target volume detection processing portion 902 performs a process that detects the target volume of the electrically-operated hydraulic actuator unit 100 based on the signal output from the target volume sensor 670, and a process that detects the battery voltage based on the signal output from the battery voltage sensor 651 (Step #2).

Next, the difference calculating portion 904 calculates the difference D between the current volume and target volume in Step #2 (Step #3), and the first duty correcting portion 9053 determines whether or not the difference D is zero (the current volume has reached the target volume) (Step #4).

If it is determined that the difference D is not zero (NO in Step #4), the first duty correcting portion 9053 reads the correction value α associated with the difference D from the correction value storage portion 9052 (Step #5), and reads the reference duty associated with the current period among the periods P1 to P4 from the reference duty storage portion 9051 (Step #6). Furthermore, the first duty correcting portion 9053 corrects the reference duty read in Step #6 using the correction value read in Step #5 (Step #7).

The limit processing portion 9054 determines whether or not the duty corrected in Step #7 by the first duty correcting portion 9053 is a value exceeding 100(%) (Step #8), and, if it is determined that the duty is a value exceeding 100(%) (YES in Step #8), performs a limit process that converts that duty into (replaces the duty with) 100 (%) and outputs duty information indicating the converted duty to the second duty correcting portion 9055 for the subsequent step (Step #9). On the other hand, if it is determined in Step #8 that the duty is not a value exceeding 100(%) (NO in Step #8), the limit processing portion 9054 skips the processing in Step #9, and outputs without any processing the duty information acquired from the first duty correcting portion 9053 to the second duty correcting portion 9055 for the subsequent step.

After the processing in Step #8 or #9, the second duty correcting portion 9055 corrects the duty indicated by the duty information output from the limit processing portion 9054 according to the battery voltage detected in Step #2 (Step #10).

Furthermore, the drive signal output portion 906 outputs a drive signal having a predetermined cycle to the electrically-operated motor 300 based on the duty information output from the second duty correcting portion 9055 (Step #11), and the procedure returns to the processing in Step #2.

Subsequently, if the first duty correcting portion 9053 determines in Step #4 that the difference D is zero (YES in Step #4), the setting of the duty by the setting portion 905 is stopped, and the output of the drive signal by the drive signal output portion 906 is also stopped (Step #12).

As described above, in the present embodiment, the clutch mechanism 360 is included. Accordingly, even if an external force to the neutral side exceeding the force of inertia of the electrically-operated motor 300 is applied to the motor-side volume adjusting mechanism 135 at the time when the electrically-operated motor 300 has been put in a non-actuated state, the volume of the electrically-operated hydraulic actuator unit 100 can be prevented from being unintentionally changed.

As a result, while allowing the motor-side volume adjusting mechanism 135 to be actuated by the electrically-operated motor 300, it is possible to prevent the volume of the electrically-operated hydraulic actuator unit 100 from being unintentionally changed by an external force applied to the motor-side volume adjusting mechanism 135 or the like.

Furthermore, the duty of the fourth drive signal that is to be output in the higher-volume-side ordinary drive period P4 is set to be larger than the duty of the second drive signal that is to be output in the neutral-side ordinary drive period P2, and, thus, when starting actuation to the higher volume side of the motor-side volume adjusting mechanism 135 that is biased to the neutral side, the operating torque can be prevented from being insufficient, and the motor-side volume adjusting mechanism 135 can be reliably actuated.

Furthermore, for the case of actuation of the motor-side volume adjusting mechanism 135 to the neutral side, the neutral-side start period P1 is provided separately from an ordinary drive period (the neutral-side ordinary drive period P2) that generates an operating torque necessary for causing the driving-side arm 361 to rotate both the driven-side arm 363 and the contact members 364, and the duty of the first drive signal that is to be output in the neutral-side start period P1 is set to be larger by the required amount than the duty of the second drive signal that is to be output in the neutral-side ordinary drive period P2, and, thus, when starting actuation of the motor-side volume adjusting mechanism 135 to the neutral side, the locked state of the clutch mechanism 360 can be reliably canceled.

Furthermore, for the case of driving to the higher volume side, the higher-volume-side start period P3 is provided separately from an ordinary drive period (the higher-volume-side ordinary drive period P4) that generates an operating torque necessary for causing the driving-side arm 361 to rotate both the driven-side arm 363 and the contact members 364, and the duty of the third drive signal that is to be output in the higher-volume-side start period P3 is set to be larger than the duty of the fourth drive signal that is to be output in the higher-volume-side ordinary drive period P4, and, thus, when starting actuation to the higher volume side of the motor-side volume adjusting mechanism 135 that is biased to the neutral side, the locked state of the clutch mechanism 360 can be reliably canceled.

Furthermore, the configuration is such that the reference duty is corrected using a correction value that is larger as the current volume of the electrically-operated hydraulic actuator unit 100 is farther from the target volume, and, thus, the operating torque of the electrically-operated motor 300 can be increased as the current volume is farther from the target volume. Accordingly, the rate of an increase in the rotational speed of the electrically-operated motor 300 can be increased, and, thus, the time until the electrically-operated hydraulic actuator unit 100 reaches the target volume can be shortened.

Furthermore, the second duty correcting portion 9055 corrects the duty indicated by the duty information output from the limit processing portion 9054 according to the current battery voltage, and, thus, even when the battery voltage changes, the control performance of the electrically-operated motor 300 can be prevented from being changed.

In the present embodiment, an example was described in which the electrically-operated hydraulic actuator unit according to the present invention is applied to one of the first and the second hydraulic motor units for driving the first and the second wheel pairs, in a work vehicle including the hydraulic pump unit and the first and the second hydraulic motor units, wherein a difference occurs between the turning radiuses of the first and the second wheel pairs. However, the electrically-operated hydraulic actuator unit according to the present invention may be embodied in other forms.

For example, the electrically-operated hydraulic actuator unit according to the present invention may be used as a hydraulic motor unit for widening the transmission range in a work vehicle.

Specifically, in a work vehicle including a vehicle frame, a driving source, first and second wheel pairs that are arranged on one side and the other side in a vehicle front-and-rear direction of the vehicle, a variable displacement hydraulic pump unit that is operatively driven by the driving source, and a hydraulic motor unit that forms an HST in cooperation with the hydraulic pump unit and drives one of the first and the second wheel pairs, the electrically-operated hydraulic actuator unit according to the present invention can be used as the hydraulic motor unit.

In this case, the electrically-operated hydraulic actuator unit functions as a sub speed-change device. That is to say, the work vehicle further includes a main speed-change device operating member for performing an operation that inputs an instruction for a main speed-change operation by the hydraulic pump unit, a sub speed-change operating member for performing an operation that inputs an instruction for a sub speed-change operation by the electrically-operated hydraulic actuator unit, a sub speed-change operation-side detecting portion that detects an amount of manual operation on the sub speed-change operating member (the target volume of the electrically-operated hydraulic actuator unit), a sub speed-change actuation-side detecting portion that detects an actuation state (a current volume) of the electrically-operated hydraulic actuator unit, and a control apparatus, wherein the electrically-operated hydraulic actuator unit acts with the sub speed-change operation being controlled by the control apparatus based on signals from the sub speed-change operation-side detecting portion and the sub speed-change actuation-side detecting portion such that a volume adjusting mechanism of the electrically-operated hydraulic actuator unit is actuated according to the amount of manual operation on the sub speed-change operating member.

Alternatively, the electrically-operated hydraulic actuator unit according to the present invention may be used as a hydraulic pump unit.

Specifically, in a work vehicle including a vehicle frame, a driving source, first and second wheel pairs that are arranged on one side and the other side in a vehicle front-and-rear direction of the vehicle, a hydraulic pump unit that is operatively driven by the driving source, and a hydraulic motor unit that forms an HST in cooperation with the hydraulic pump unit and drives one of the first and the second wheel pairs, the electrically-operated hydraulic actuator unit according to the present invention can be used as the hydraulic pump unit.

In this case, the electrically-operated hydraulic actuator unit functions as a main speed-change device. That is to say, the work vehicle further includes a main speed-change operating member for performing an operation that inputs an instruction for a main speed-change operation by the hydraulic pump unit, a main speed-change operation-side detecting portion that detects an amount of manual operation on the main speed-change operating member (the target volume of the electrically-operated hydraulic actuator unit), a main speed-change actuation-side detecting portion that detects an actuation state (a current volume) of the electrically-operated hydraulic actuator unit, and a control apparatus, wherein the electrically-operated hydraulic actuator unit acts with the main speed-change operation being controlled by the control apparatus based on signals from the main speed-change operation-side detecting portion and the main speed-change actuation-side detecting portion such that a volume adjusting mechanism of the electrically-operated hydraulic actuator unit is actuated according to the amount of manual operation on the main speed-change operating member.

In the present embodiment, regarding setting conditions of the duties of the first to the fourth drive signals, the duty Dt3 of the third drive signal that is to be output in the higher-volume-side start period P3 is set to be larger than the duty Dt1 of the first drive signal that is to be output in the neutral-side start period P1 on the assumption that the length of the higher-volume-side start period P3 is set to be longer than the length of the neutral-side start period P1, but there is no limitation to this. For example, the duty Dt3 may be the same as the duty Dt1, in the case where the length of the higher-volume-side start period P3 is set to be much longer than the length of the neutral-side start period P1.

On the other hand, on the assumption that the length of the higher-volume-side start period P3 is set to be the same as the length of the neutral-side start period P1, the third duty Dt3 has to be set to be larger than the first duty Dt1.

In summary, a gist of the present invention lies in an aspect that the operating torque of the electrically-operated motor 300 in the higher-volume-side start period P3 is set to be larger than the operating torque of the electrically-operated motor 300 in the neutral-side start period P1, focusing on the facts that the motor-side volume adjusting mechanism 135 is biased to the neutral side and that the locked state of the clutch mechanism 360 has to be canceled, and the present invention can be embodied in various forms as long as an integrated value of the time during which the third drive signal that is to be output in the higher-volume-side start period P3 is on-state is larger than an integrated value of the time during which the first drive signal that is to be output in the neutral-side start period P1 is on-state.

Furthermore, in the present embodiment, the first duty correcting portion 9053 is provided that corrects the reference duty associated with the current period among the periods P1 to P4 using the correction value associated with the difference calculated by the difference calculating portion 904, but the first duty correcting portion 9053 is not an essential constituent component, and the present invention includes an embodiment in which correction by the first duty correcting portion 9053 is not performed.

In this case, the electrically-operated hydraulic actuator unit may be provided with, instead of the second duty correcting portion 9055, a reference duty correcting portion that corrects a duty read from the reference duty storage portion 9051 according to a current battery voltage and outputs duty information indicating the corrected duty to the drive signal output portion 906.

DESCRIPTION OF THE REFERENCE NUMERALS 1 hydraulic four-wheel-drive work vehicle (work vehicle)
10 first wheel
20 second wheel
30 vehicle frame
31 first frame
32 second frame
35 pivotal support shaft
40 driving source
50 hydraulic pump unit
52 hydraulic pump
54 pump-side volume adjusting mechanism
90 control apparatus
100 electrically-operated hydraulic actuator unit (first hydraulic motor unit)
120 first hydraulic motor
135 motor-side volume adjusting mechanism
200 second hydraulic motor unit
300 electrically-operated motor
340 operating shaft
350 sensor unit for current volume
360 clutch mechanism
650 battery
651 battery voltage sensor
670 target volume sensor
680 sensor portion
901 current volume detection processing portion
902 target volume detection processing portion
903 battery voltage detection processing portion
904 difference calculating portion
905 duty setting portion
9051 reference duty storage portion
9052 correction value storage portion
9053 first duty correcting portion
9054 limit processing portion
9055 second duty correcting portion
906 drive signal output portion

The invention claimed is:

1. An electrically-operated hydraulic actuator unit comprising a variable displacement hydraulic actuator, an electrically-operated motor that generates an operating force for actuating a volume adjusting mechanism included in the variable displacement hydraulic actuator, and a control apparatus that controls action of the electrically-operated motor, wherein the electrically-operated hydraulic actuator unit further comprises a clutch mechanism interposed between the volume adjusting mechanism and the electrically-operated motor, wherein the clutch mechanism includes a driving-side member that is rotated around a clutch reference axis by a rotational power from the electrically-operated motor, a driven-side member that is rotated around the clutch reference axis by the driving-side member and that is operatively linked to the volume adjusting mechanism, a clutch case that surrounds the driving-side member and the driven-side member, and a contact member accommodated in the clutch case so as to be rotated around the clutch reference axis along with the driven-side member by the driving-side member, the clutch mechanism being configured such that, when the driven-side member is pressed around the clutch reference axis by a force from the volume adjusting mechanism in a case where the electrically-operated motor is in a non-actuated state, the driven-side member presses the contact member against the clutch case to cause the driven-side member to be in a non-rotational locked state, whereby a power transmission from the driven-side member to the driving-side member is prevented, wherein the control apparatus includes a drive signal output portion that outputs a drive signal having a predetermined cycle to the electrically-operated motor, and a duty setting portion that sets a duty of the drive signal to be output by the drive signal output portion, wherein the duty setting portion sets a duty of a first drive signal that is to be output to the electrically-operated motor within a neutral-side start period having a predetermined time duration from a starting point in time at which an actuation of the motor toward the neutral side is started and a duty of a second drive signal that is to be output to the electrically-operated motor within a neutral-side ordinary period after the neutral-side start period when the volume adjusting mechanism has to be activated to the neutral side, while setting a duty of a third drive signal that is to be output to the electrically-operated motor within a higher-volume-side start period having a predetermined time duration from a starting point in time at which an actuation of the motor toward the higher-volume side is started and a duty of a fourth drive signal that is to be output to the electrically-operated motor within a higher-volume-side ordinary period after the higher-volume-side start period when the volume adjusting mechanism has to be activated to the higher-volume side, and wherein the duties of the first to fourth drive signal are set so that the duties of the first and fourth drive signals are larger than the duty of the second drive signal, and the duty of the third drive signal is larger than the duty of the fourth drive signal, while an integrated value of the time during which the third drive signal that is to be output within the higher-volume-side start period is on-state is larger than an integrated value of the time during which the first drive signal that is to be output within the neutral-side start period is on-state.

2. The electrically-operated hydraulic actuator unit according to claim 1, wherein a length of the higher-volume-side start period is longer than a length of the neutral-side start period, and wherein the duty setting portion sets, as the duty of the third drive signal, a duty larger than or equal to the duty of the first drive signal.

3. The electrically-operated hydraulic actuator unit according to claim 1, wherein a length of the higher-volume-side start period is same as a length of the neutral-side start period, and wherein the duty setting portion sets, as the duty of the third drive signal, a duty larger than the duty of the first drive signal.

4. The electrically-operated hydraulic actuator unit according claim 1, further comprising:

a current volume detecting portion that detects a current volume of the variable displacement hydraulic actuator, a target volume detecting portion that detects a target volume of the variable displacement hydraulic actuator, and a difference calculating portion that calculates a difference between the current volume detected by the current volume detecting portion and the target volume detected by the target volume detecting portion, and wherein the duty setting portion determines whether the direction in which the volume adjusting mechanism is to be actuated is the higher volume side or the neutral side, based on the difference calculated by the difference calculating portion, and then sets either a set of the duties of the first and the second drive signals or a set of the duties of the third and the fourth drive signals according to the determination result.

5. The electrically-operated hydraulic actuator unit according to claim 1, wherein the duty setting portion includes a reference duty storage portion that stores, as respective reference duties, initial values of duties that have been preset for the first to the fourth drive signals, a correction value storage portion that stores in advance a correction value for correcting the reference duty according to the difference calculated by the difference calculating portion, and a first duty correcting portion that reads the correction value associated with the difference from the correction value storage portion upon the calculation of the difference by the difference calculating portion and then corrects the reference duty associated with the current period among the periods with using the read correction value.

6. The electrically-operated hydraulic actuator unit according to claim 5, wherein the correction value is set to become larger as the difference increases.

7. The electrically-operated hydraulic actuator unit according to claim 5, wherein the duty setting portion further includes a second duty correcting portion for correcting the duty, which has been corrected by the first duty correcting portion, according to a voltage of a battery that is an electrical power source of the electrically-operated motor.

8. The electrically-operated hydraulic actuator unit according to claim 7, wherein the second duty correcting portion performs the correction so that the duty becomes smaller in proportion to increase of the voltage of the battery.

9. The electrically-operated hydraulic actuator unit according to claim 1, wherein the duty setting portion includes a reference duty storage portion that stores, as respective reference duties, initial values of duties that have been preset for the first to the fourth drive signals, and a reference duty correcting portion that corrects the reference duty of one of the first to fourth drive signals that is to be output associated with the current period in accordance with a voltage of a battery functioning as an electrical power source of the electrically-operated motor.

10. The electrically-operated hydraulic actuator unit according to claim 9, wherein the reference duty correcting portion performs the correction so that the duty becomes smaller in proportion to increase of the voltage of the battery.

11. The electrically-operated hydraulic actuator unit according to claim 1, wherein the driving-side member is configured such that side faces oriented in the circumferential direction with respect to the clutch reference axis can press, in the circumferential direction, respective side faces oriented in the circumferential direction of the driven-side member and the contact member, and wherein when viewed along the clutch reference axis, an outer end face of the driven-side member oriented outward in the radial direction has a circumferential center portion in which a distance to the axis is smaller than a distance (L) from the contact member to the axis and a circumferential outer portion in which the distance to the axis is larger than the distance (L).

12. A hydraulic four-wheel-drive work vehicle comprising, a vehicle frame, a driving power source supported by the vehicle frame, first and second wheels supported by one and the other sides in a front-and-rear direction of the vehicle frame, a hydraulic pump unit operatively driven by the driving power source, and first and second hydraulic motor units that are fluid-connected to the hydraulic pump unit and that operatively drives the first and second wheels, respectively, wherein the first hydraulic motor that operatively drives the first wheel is embodied by the electrically-operated hydraulic actuator unit according to claim 1.

* * * * *